(12) United States Patent
Tian et al.

(10) Patent No.: US 7,561,714 B2
(45) Date of Patent: Jul. 14, 2009

(54) REVERSIBLE WATERMARKING

(75) Inventors: Jun Tian, Tualatin, OR (US); Stephen K. Decker, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 1086 days.

(21) Appl. No.: 10/319,404

(22) Filed: Dec. 12, 2002

(65) Prior Publication Data
US 2003/0149879 A1 Aug. 7, 2003

Related U.S. Application Data

(60) Provisional application No. 60/430,511, filed on Dec. 2, 2002, provisional application No. 60/404,181, filed on Aug. 16, 2002, provisional application No. 60/340,651, filed on Dec. 13, 2001.

(51) Int. Cl.
*G06K 9/00* (2006.01)
(52) U.S. Cl. ...................................... 382/100
(58) Field of Classification Search .................. 382/100
See application file for complete search history.

(56) References Cited

U.S. PATENT DOCUMENTS

| | | | |
|---|---|---|---|
| 4,750,173 A | 6/1988 | Bluthgen | |
| 5,146,457 A | 9/1992 | Veldhuis et al. | |
| 5,646,997 A | 7/1997 | Barton | |
| 5,659,726 A * | 8/1997 | Sandford et al. | 707/101 |
| 5,822,432 A | 10/1998 | Moskowitz et al. | |
| 5,825,892 A | 10/1998 | Braudaway et al. | |
| 5,889,868 A | 3/1999 | Moskowitz et al. | |
| 6,192,138 B1 | 2/2001 | Yamadaji | |
| 6,208,745 B1 | 3/2001 | Florencio et al. | |
| 6,215,421 B1 | 4/2001 | Kondo et al. | |
| 6,278,791 B1 * | 8/2001 | Honsinger et al. | 382/100 |
| 6,311,214 B1 | 10/2001 | Rhoads | |
| 6,456,726 B1 | 9/2002 | Yu et al. | |

(Continued)

FOREIGN PATENT DOCUMENTS

EP    1 220 152    11/2002

(Continued)

OTHER PUBLICATIONS

Celik et al., "Reversible Data Hiding," Proc. Int. Conv. Image Processing, vol. II, Sep. 2002, pp. 157-160.

(Continued)

*Primary Examiner*—Tom Y Lu

(57) ABSTRACT

A reversible watermarking method embeds auxiliary data into a data set, such as an image, audio, video or other data, in a manner that enables full recovery of the original, un-modified data set. This method may be used to determine whether the data set has been tampered. To improve embedding capacity without the need for compression of the auxiliary data, the method uses an expansion technique. One particular approach exploits the correlation or redundancy within the data set to convert the data to a set of small, expandable values, such as difference values. These small values are then expanded by inserting auxiliary data as one or more additional bits, increasing the number of bits without causing an underflow or overflow. This approach also uses a property of the data set that is invariant to the embedding operation to identify embedding locations, obviating the need for separate data to identify where data is embedded in a data set.

30 Claims, 7 Drawing Sheets

U.S. PATENT DOCUMENTS

| | | | |
|---|---|---|---|
| 6,490,681 | B1 | 12/2002 | Kobayashi et al. |
| 6,523,114 | B1 | 2/2003 | Barton |
| 6,546,139 | B1 | 4/2003 | Kondo et al. |
| 6,577,746 | B1 | 6/2003 | Evans et al. |
| 6,633,652 | B1 | 10/2003 | Donescu |
| 6,668,246 | B1 | 12/2003 | Yeung et al. |
| 6,947,571 | B1 | 9/2005 | Rhoads et al. |
| 7,006,662 | B2 | 2/2006 | Alattar et al. |
| 7,085,396 | B2 * | 8/2006 | Pelly et al. ............... 382/100 |
| 2001/0021260 | A1 | 9/2001 | Chung et al. |
| 2001/0044899 | A1 | 11/2001 | Levy |
| 2001/0054146 | A1 | 12/2001 | Carro et al. |
| 2002/0013903 | A1 | 1/2002 | Le Floch |
| 2002/0027994 | A1 | 3/2002 | Katayama et al. |
| 2002/0040433 | A1 | 4/2002 | Kondo |
| 2002/0059520 | A1 | 5/2002 | Murakami et al. |
| 2002/0080964 | A1 | 6/2002 | Stone et al. |
| 2002/0083324 | A1 | 6/2002 | Hirai |
| 2002/0114463 | A1 | 8/2002 | Pelly et al. |
| 2002/0118859 | A1 | 8/2002 | Stone et al. |
| 2002/0124173 | A1 | 9/2002 | Stone |
| 2002/0131617 | A1 | 9/2002 | Pelly et al. |
| 2002/0146123 | A1 | 10/2002 | Tian |
| 2002/0171853 | A1 | 11/2002 | Wu |
| 2002/0199106 | A1 | 12/2002 | Hayashi |
| 2003/0012403 | A1 | 1/2003 | Rhoads et al. |
| 2003/0053653 | A1 | 3/2003 | Rhoads |
| 2003/0081809 | A1 | 5/2003 | Fridrich et al. |
| 2003/0163305 | A1 | 8/2003 | Cheng et al. |

FOREIGN PATENT DOCUMENTS

| | | |
|---|---|---|
| WO | 99/17537 | 4/1999 |
| WO | 0074371 | 12/2000 |
| WO | 02/089056 | 7/2002 |

OTHER PUBLICATIONS

Celik et al, "Lossless Generalized-LSB Data Embedding," IEEE Trans. Image Processing, submitted for publication, Jul. 2002, 14 pages.

Fridrich et al., "Lossless Data Embedding—New Paradigm in Digital Watermarking," EURASIP J. Appl. Signal Processing, vol. 2002, No. 2, Feb. 2002, pp. 185-196.

Kalker et al, Capacity Bounds and Constructions for Reversible Data Hiding, Proc. 14$^{th}$ Int. Conf. Digital Signal Processing, vol. 1, Jul. 2003, pp. 71-76.

Tian, "Reversible Watermarking by Difference Expansion," Proc. Workshop on Multimedia and Security, Dec. 2002, pp. 19-22.

Tian, "Reversible Data Embedding Using a Difference Expansion," IEEE Tran. Circuits and Systems for Video Technology, vol. 13, pp. 890-896, Aug. 2003.

Bartolini et al, "Image Authentication Techniques for Surveillance Applications," Proc. of IEEE, vol. 89, No. 10, Oct. 2001, pp. 1403-1418.

Craver et al, Can Invisible Watermarks Resolve Rightful Ownerships? IBM Research Report RC20509, 21 pages, 1996.

Dittmann et al, "Watermarking Protocols For Authentication And Ownership Protection Based On Timestamps And Holograms," Proc. SPIE, vol. 4675, pp. 240-251, Jan. 2002.

Fridrich et al, "Fragile Authentication Watermark for Images," ICIP 2000, Vancouver, Sep. 10-13, 2000.

Fridrich, "Methods for Tamper Detection in Digital Images," Proc. ACM Workshop on Multimedia and Security, Orlando, FL, Oct. 30-31, 1999, pp. 19-23.

Hara et al, An Improved Method of Embedding Data Into Pictures by Modulo Masking, IEEE Transactions on Communications vol. 36, No. 3, Mar. 1988.

Macq, "Lossless Multiresolution Transform For Image Authenticating Watermarking," *Proceedings of EUSIPCO*, Sep. 2000.

Xedeas et al, Embedding Data into Pictures by Modulo Masking, IEEE Transactions on Communications vol. Com-32, No. 1, Jan. 1984.

De Vleeschouwer et al, "Circular interpretation of histogram for reversible watermarking," IEEE Fourth Workshop on Multimedia Signal Processing, pp. 345-350, Oct. 2001.

Domingo-Ferrer et al, "Invertible spread-spectrum watermarking for image authentication and multilevel access to precision-critical watermarked images," Proc. IEEE Int'l Conf on Information Technology: Coding and Computing, pp. 152-157, Apr. 2002.

Fridrich et al, "Invertible authentication," Proc. SPIE, vol. 4314, pp. 197-208, Jan. 2001.

Fridrich et al, "Invertible authentication watermark for JPEG images," Proc. IEEE Int'l Conf on Information Technology: Coding and Computing, pp. 223-227, Apr. 2001.

Fridrich et al, "Lossless data embedding for all image formats," Proc. SPIE, vol. 4675, pp. 572-583, Jan. 2002.

Fridrich et al, Lossless Data Embedding—New Paradigm in Digital Watermarking, *EURASIP, Emerging Applications of Multimedia Data Hiding*, vol. 2002, No. 2, pp. 185-196, Feb. 2002.

Goljan et al, "Distortion-free Data Embedding," *4th Information Hiding Workshop*, LNCS vol. 2137, pp. 27-41, Apr. 2001.

Park et al, "Invertible semi-fragile watermarking algorithm distinguishing MPEG-2 compression from malicious manipulation," IEEE International Conference on Consumer Electronics, pp. 18-19, Jun. 2002.

Tian, "Wavelet-based reversible watermarking for authentication," Proc. SPIE, vol. 4675, pp. 679-690, Jan. 2002.

Tian, "Wavelet-based image compression and content authentication," Proc. SPIE, vol. 4551, pp. 11-20, Oct. 22, 2001.

Office Action dated Jan. 5, 2005, Applicants' Response dated May 5, 2005, and Notice of Allowance and Issue Fee Due dated Jul. 14, 2005, all in U.S. Appl. No. 10/435,517, Alattar et al, filed May 8, 2003.

* cited by examiner

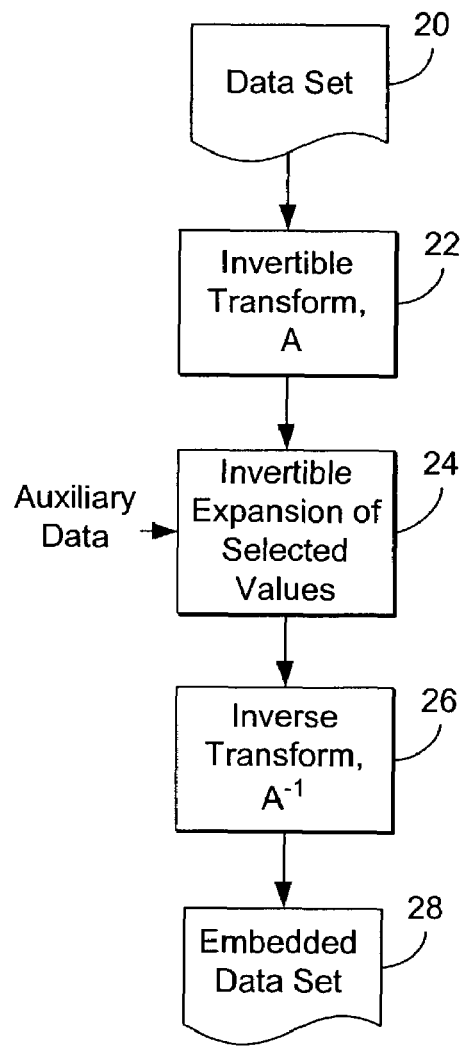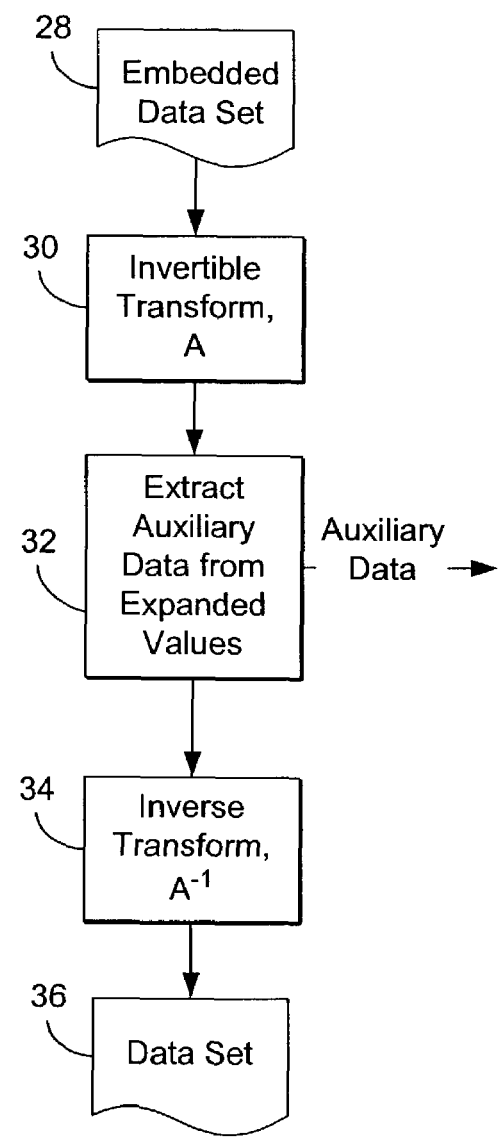
FIG. 1A
FIG. 1B

REVERSIBLE WATERMARKING

RELATED APPLICATIONS

This application claims the benefit of provisional application 60/404,181, filed Aug. 16, 2002, 60/340,651, filed Dec. 13, 2001, and 60/430,511, filed Dec. 2, 2002, entitled Reversible Watermarking by Jun Tian and Steve Decker.

This application is also related to application Ser. No. 10/035,830 filed Oct. 18, 2001 (Now U.S. Pat. No. 7,389,420), which claims the benefit of provisional applications:

a) 60/247,389, filed Nov. 8, 2000;
b) 60/260,907, filed Jan. 10, 2001; and
c) 60/284,594 filed Apr. 17, 2001.

The entire content of the above listed applications is hereby incorporated herein by reference.

FIELD OF THE INVENTION

The invention relates to steganography, auxiliary data embedding in data sets, and digital watermarks.

BACKGROUND AND SUMMARY

The technology for digital watermarking media content, such as images, video and audio is well known. A variety of different types of digital watermarks have been developed. Some types of digital watermarks can be read from watermarked data despite changes in the data. For example, some types of image watermarks can survive when the watermarked image is rotated, spatially scaled, lossily compressed, and/or printed. Some video and audio watermarks survive when the watermarked content is lossily compressed, converted to analog form, and re-sampled into digital form.

Some digital watermarks are designed to be fragile so that if the watermarked data is changed the watermark is rendered unreadable or is degraded in a predictable fashion. Such watermarks can be used to determine if a watermarked document has been changed based on detection of the digital watermark. If certain data is watermarked with a fragile watermark, and the data is later changed the watermark is degraded or rendered unreadable. Thus, the absence or degradation of a watermark will indicate that the data has been changed.

Some digital watermarks are designed to be reversible. A watermark is reversible if a data set can be watermarked, thereby changing the data somewhat, and at a later time the watermark can be removed in order to return to the original un-watermarked data set.

The technique used to watermark an image (or data set) determines such factors as: the extent to which a watermark can survive changes in an image, the amount of change in an image needed to destroy a fragile watermark, and how accurately an image can be recreated after a reversible watermark is removed.

One challenge that occurs with some reversible watermarks is that they can cause overflow or underflow conditions. For example, consider a digital image or audio signal that is represented by values from 0 to 255. If during the digital watermarking operation, a digital sample with the value of 254 is increased by 2, there will be an overflow condition. Likewise, if a sample with a value of 1 is decreased by 2, an underflow condition will occur. When an overflow or underflow occurs during a watermarking operation, it poses limitations on the ability to recover the original, un-watermarked signal.

The invention provides a number of methods and related software and systems for embedding auxiliary data in data sets, and for decoding this auxiliary data from the data sets. One aspect of the invention is a method of reversibly embedding auxiliary data in a data set. This method transforms the data set from an original domain into transformed data values with an invertible transform. It expands selected data values to embed auxiliary data. The method then inverts the transformed data values, including the data values selected for expansion, to return the transformed data values to the original domain.

Another aspect of the invention is a compatible decoder for extracting the embedded data and restoring the values of the data set to the same values as before embedding of the auxiliary data. This decoder transforms the data set from an original domain into transformed data values with an invertible transform. It extracts auxiliary data from data values previously selected for embedding of auxiliary data by expansion, and restores the selected data values to the same values as before the embedding of the auxiliary data. It then inverts the transformed data values, including the data values selected for expansion, to return the transformed data values to the original domain.

Another aspect of the invention is a method of reversibly embedding auxiliary data in a data set. This embedding method selects embedding locations in the data set that have a property that is invariant to changes due to embedding of the auxiliary data. The invariant property enables a decoder to identify embedding locations. The embedding method then reversibly embeds auxiliary data into data values at the embedding locations.

Another aspect of the invention is a method of decoding reversibly embedded auxiliary data in a data set. This method identifies a subset of locations in the data set that have a property that is invariant to changes due to embedding of the auxiliary data. It extracts auxiliary data from data values at the identified locations. It then restores values of the data set to the same values as before the embedding of the auxiliary data into the data set.

Another aspect of the invention is a method of embedding auxiliary data in a data set. This method identifies values derived from the data set that are expandable. It expands the identified values by inserting an auxiliary data state corresponding to auxiliary data to be embedded in the identified values. This method has a corresponding decoding method, and can be used for reversible data embedding applications.

Further features will become apparent from the following detailed description and accompanying drawings.

BRIEF DESCRIPTION OF THE DRAWINGS

FIG. 1A is a diagram illustrating an expansion method for auxiliary data embedding into a data set.

FIG. 1B is a diagram illustrating an auxiliary data decoder compatible with the data embedding method of FIG. 1A

DETAILED DESCRIPTION

Figure 1C:
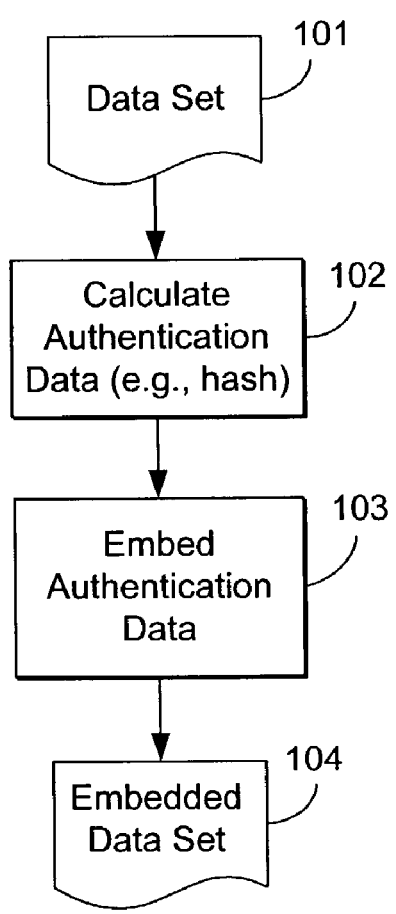
FIG. 1C is a diagram illustrating an embedding operation for authentication applications.

Various preferred embodiments of the invention will be described. The embodiments provide a method or technique for embedding a digital watermark into a data set, such as an image. Embodiments illustrate a reversible watermarking method that enables decoding of the digital watermark, and exact re-creation of the original, un-watermarked data.

While certain embodiments described below relate to digital watermarking of image signals, the invention can be used to watermark other types of data such as audio data.

FIG. 1A illustrates a flow diagram of an expansion method for auxiliary data embedding into a data set. This particular method is designed to be invertible in cases where there are no changes to the data set (e.g., "fragile" data embedding). Variations of the method may be designed to make the data method more robust to certain types of changes to the data set and partially reversible. For example, the method may be employed hierarchically to transformations of the data set into layers of values that have varying robustness.

As illustrated in FIG. 1A, the embedder starts with a data set 20. For applications that we are targeting, this data set comprises a set of integers (e.g., 8 bit values ranging from 0-255). The embedder performs an integer to integer transform of the data into values for expansion (22). This transform maps sets of data elements in the data set into values for expansion. The embedder applies this transform across the entire data set to be embedded with auxiliary data (e.g., it is repeated on groups of elements throughout the data set). Note that in some applications, the data may undergo one or more pre-processing steps to place the data into a better format for the data embedding method.

The specific type of transform may vary, and the implementer may select the transform for the needs of the application. One of our applications of the method is reversible digital watermark embedding for images. Our criteria include making the embedding operation perfectly reversible, maintaining (or at least controlling to a desired degree) the perceptual quality of the image signal, and embedding capacity of the digital watermark. In other applications, other objectives may be important, such as retaining some level of lossless compressibility of the embedded data, enhancing the security of the embedding process (e.g., making the nature of the transform statistically undetectable), etc.

In our specific embodiments, the embedder transforms sets of integer data to corresponding sets of values for expansion, including fixed and variable values. The fixed values remain unchanged in the subsequent expansion embedding operation. The variable values are selected for expansion to serve as carriers of the embedded data. We selected a transform that generates fixed values that enables reversibility and perceptual quality control. We also selected this transform because it generates small integer variable values that are likely to be more expandable to provide for higher information carrying capacity. The specific transform is a transform of sets of the data into corresponding sets of averages and difference values. Other transforms that satisfy the criteria may be selected as well.

Next, the embedder performs an invertible expansion of values in the sets of values transformed for expansion (24). This expansion is referred to as invertible because it enables the auxiliary data decoder to extract the embedded data values for each set, and compute the original data values computed for expansion in the embedder.

The sets of data include two or more data elements. The embedder transforms these data elements into a corresponding set of values for expansion. The embedder embeds auxiliary data by expanding selected values for expansion in this set into expanded values that represent auxiliary data. The auxiliary data may be binary or higher state (e.g., two or more possible states for the embedded data value).

In the case of the transform to sets of fixed and variable values, the embedder expands the variable values into expanded values that carry the binary or higher embedded state. The expansion operation multiplies a value for expansion by an integer corresponding to the number of states and adds the desired state.

Here are examples of expanding an integer, I, using a two or more state expansion operation:

Two States:

$2I+0$ $2I+1$

Three States:

$3I+0$ $3I+1$ $3I+2$

N States:

$NI+0$ $NI+1$ $NI+2$

.

.

$NI+(N-1)$

Next, the embedder performs the inverse of the transform in block 22 on the sets of values, including expanded values (26). This inverse transform returns the embedded data set 28 back to its original domain at the input of the process.

FIG. 1B illustrates the corresponding auxiliary data decoder. First, the decoder performs the same transform as in block 22 to place the data into the domain where it was expanded (30). Next, the decoder extracts the auxiliary data values by performing the inverse of the invertible expansion operation (32). In the case where the expansion multiplies by the number of states and adds the desired state, the decoder extracts the embedded data value directly by reading the state that has been added to the expanded value. This inverse of the expansion provides the original un-expanded value as well as the embedded data value.

Having recovered the un-expanded value in the set, the decoder now performs the inverse transform (34) as in block 26 to get the original data set 36.

To help illustrate, we show examples of this method in mathematical form. First, we illustrate an example of a transform of data elements, $p_1$, $p_2$, and $p_3$, into values for expansion a, $d_1$, and $d_2$.

Generally, the transformation involves two or more elements of the data set into the values for potential expansion. In this case, we illustrate a transform involving three elements of the data set:

$$\begin{bmatrix} a \\ d_1 \\ d_2 \end{bmatrix} = f\left(\begin{bmatrix} p_1 \\ p_2 \\ p_3 \end{bmatrix}\right)$$

A specific example of the function $f$ is:

$$a = \left\lfloor \frac{p_1 + p_2 + p_3}{3} \right\rfloor$$

$$d_1 = p_2 - p_1$$

$$d_2 = p_3 - p_1$$

where $\lfloor \ \rfloor$, is the least integer function.

For embedding data in digital images, the data elements correspond to discrete image samples, such as pixels in the spatial domain of the image. In this example, one can see that the value, a, comprises an average of the elements, while $d_1$ and $d_2$ comprise difference values of selected pairs of the elements. The average may be weighted differently. For images, the data samples may correspond to grayscale values, or for color images, the samples may correspond to luminance, chrominance, or a selected combination of samples from some other color channel or color mapping. As an example, the color components R, G, B or CMY, may be uncorrelated before embedding and then independently embedded. Alternatively, the transform A may compute the fixed value as a function of the RGB values: (R+2G+B)/4, for example.

Though not a requirement, this transformation shows an example of a case where the transform produces fixed and variable values: a remains fixed in the expansion operation, while $d_1$ and $d_2$ are potentially expanded.

This example illustrates that the data elements in the set, and their arrangement in the original data set may vary. In the case where the implementer is seeking better embedding capacity, the data elements are preferably selected to provide highly expandable values. In an invertible expansion method, smaller values are preferable because they can be expanded further before causing a non-invertible exception, namely, an underflow or overflow of the data elements, which are constrained to a predetermined range of integers.

In the case of digital data, such as 8 bit values, the values are constrained to a range of integers such as 0 to 255. In the case of digital image pixels that are transformed into fixed average values and expandable differences, highly correlated pixel values provide the smallest difference values, and as such, are more expandable. Thus, selecting a pattern of neighboring data elements tends to provide groups of correlated elements, whose difference values are more expandable.

The $2^{nd}$ and $3^{rd}$ equations representing the transformation are merely functions that give small numbers that are expandable. The difference between two correlated values is just one example. Anther example is the difference between a data element and some fixed value such as 0 or 255. By varying the transform function adaptively throughout the data set, the embedder can optimize the capacity, perceptibility, or some other combination of criteria. To inform the decoder of the proper function selected at embedding, the embedder may base the selection of the function based on data element features that are invariant to the embedding operation, or it may make the identification of the function part of the key used to decode the embedded data.

Next, to illustrate data embedding through expansion in this example, consider the following expression:

$$\begin{bmatrix} p'_1 \\ p'_2 \\ p'_3 \end{bmatrix} = f^{-1}\left(E\begin{bmatrix} a \\ d_1 \\ d_2 \end{bmatrix} + \begin{bmatrix} 0 \\ s_1 \\ s_2 \end{bmatrix}\right),$$

where $f^{-1}$ is the inverse function of $f$ as shown in the following example:

$$p_1 = a - \left\lfloor \frac{d_1 + d_2}{3} \right\rfloor$$

$$p_1 = d_1 - p_1$$

$$p_2 = d_2 - p_1$$

E is the expansion matrix as shown in the following example:

$$\begin{bmatrix} p'_1 \\ p'_2 \\ p'_3 \end{bmatrix} = f^{-1}\left(\begin{bmatrix} 1 & 0 & 0 \\ 0 & N1 & 0 \\ 0 & 0 & N2 \end{bmatrix}\begin{bmatrix} a \\ d_1 \\ d_2 \end{bmatrix} + \begin{bmatrix} 0 \\ s_1 \\ s_2 \end{bmatrix}\right)$$

In this example, the first row of the expansion matrix illustrates that a is the fixed value, while the next two rows represent functions that expand values $d_1$ and $d_2$ as a function of the number of states, N, and the desired state of the symbol to be embedded, s. The number of states per expandable value is variable. The total number, M (3 in the example above), of data elements, p, is also variable in function $f$.

The total embedding capacity per grouping of elements, p, in the function $f$ can be represented as:

(M−1))Log$_2$N bits; and the capacity per data element, p can be represented as:

((M−1)/M) Log$_2$N bits

As shown in this example, the transformation of the expanded data by the inverse of $f$, produces the embedded data set, $p_1'$, $p_2'$ and $p_3'$.

For reversibility, the embedder preferably uses invertible integer to integer transforms. In our implementation, we use the floor function to ensure that the functions, $f$ and E, are integer to integer and invertible.

The methods outlined above may be repeated on the data set to embed additional layers of auxiliary data, each possibly with a different decoding key used to enable decoding of the layer. Specifically, the input of one embedding operation may produce an embedded data set that is input to another embedding operation. This embedding may be performed repeatedly and hierarchically to embed additional data. A hierarchical approach applied to expandable values in different transform domains of varying robustness can provide an embedding scheme that is robust and reversible in part. One example would be to apply the method hierarchically to different spatial resolutions of an image. For example, the implementer may seek to embed data by expanding the difference of average values, which are more robust to distortion.

As the implementer seeks to improve the performance of the data embedding to optimize capacity, perceptual quality, robustness, detectability, etc., the domain of the data set and the transform of the data set to values for expansion may be selected to optimize the desired performance criteria.

As the implementer seeks to make the data embedding more robust, there are tradeoffs with embedding capacity and being able to achieve perfect reversibility. If the embedded data must survive certain types of distortion, the distortion may preclude reversibility of all or a portion of the data that is embedded in attributes that are altered by the distortion. Conversely, unaltered robust attributes that carry the embedded data can remain reversible.

In general, to increase robustness, the implementer can select a pre-processing operation on the data set that transforms it into a domain that is more robust to the expected forms of distortion. For example, if some loss of the original data were tolerated, the original data set may be pre-quantized with more coarse quantization before applying the data embedding method. Also, while our examples focus on spatial domain pixels, the data embedding method applies to other domains such as wavelet, DCT, Fourier, etc.

One observation of the example transform of data to fixed averages and expandable differences is that a lower resolution thumbnail image may be computed using the average function. In this case, the thumbnail of the watermarked and un-watermarked image computed by this average function are the same.

For images, the method may be repeated on contiguous tiles of pixels, each embedded with its own reference code that enables the data to be robust to cropping.

Figure 1D:
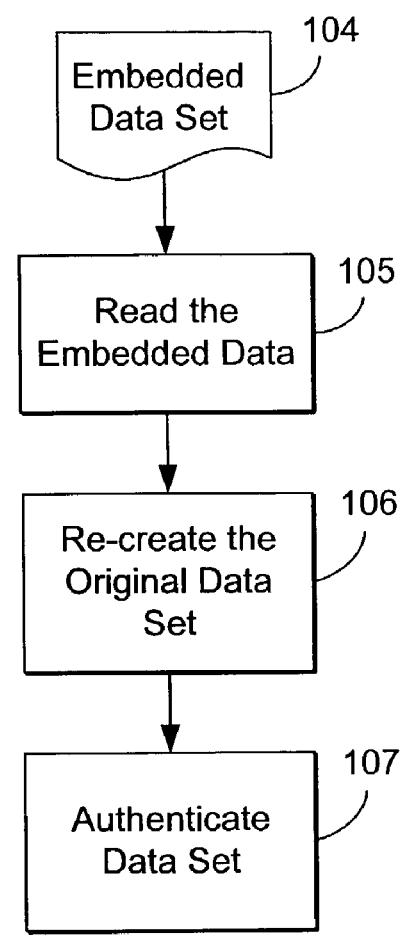
FIG. 1D is a diagram illustrating authentication by extracting the embedded data, re-creating the original data, and using the embedded data to authenticate the data.

FIGS. 1C and 1D shows compatible embedder and decoder processes that ensure there is no difference between the original data set and the re-created data set. The process begins with an original data set 101. As indicated by block 102, the embedder calculates authentication data, such as a hash of the original data, error detection data, a fixed message, or an error correction encoded message that can be analyzed to detect the presence of errors in the embedded data. As indicated by block 103, the embedder embeds auxiliary data in the data set 101, including the authentication data along with other auxiliary data. The embedded data set is designated 104.

When one wants to recreate the original data set, the embedded data set 104 is processed as indicated by block 105 to read the embedded auxiliary data. Processes used to read the auxiliary data are explained further below. The authentication data and various other auxiliary data are extracted from the embedded data set 104. The extracted data is used to re-create the original data set from the embedded data set as indicated by block 106. Finally, the reader uses the authentication data to check whether the re-created data set is unmodified (e.g., the same as the original data set). For example, a new hash number X2 is calculated from the re-created data set. If the hash number X2 equals the embedded hash X, it means that the original data set and the re-created data set are identical.

Alternatively, an error detection message can be used to detect whether the extracted auxiliary data is error free, which is expected if the embedded data set has not been modified. Other fixed data messages in the auxiliary data can be checked for errors by comparison with a known, expected message. Finally, an error corrected version of embedded data may be used to regenerate a new error correction encoded message, which is then compared with the extracted, error correction encoded message to check for errors.

In some applications, it is useful to be able to identify where auxiliary data is embedded in an embedded data set using only the embedded data (e.g., without a map separate from the embedded data). One approach to accomplish this is to identify and embed at least some of the auxiliary data in embedding locations that are identifiable before and after the embedding operation. In particular, certain features can be selected that are invariant to the embedding operation and serve to identify an embedding location. These features enable the auxiliary data decoder to identify variable embedding locations by finding the location of features with the invariant property.

Figure 1E:
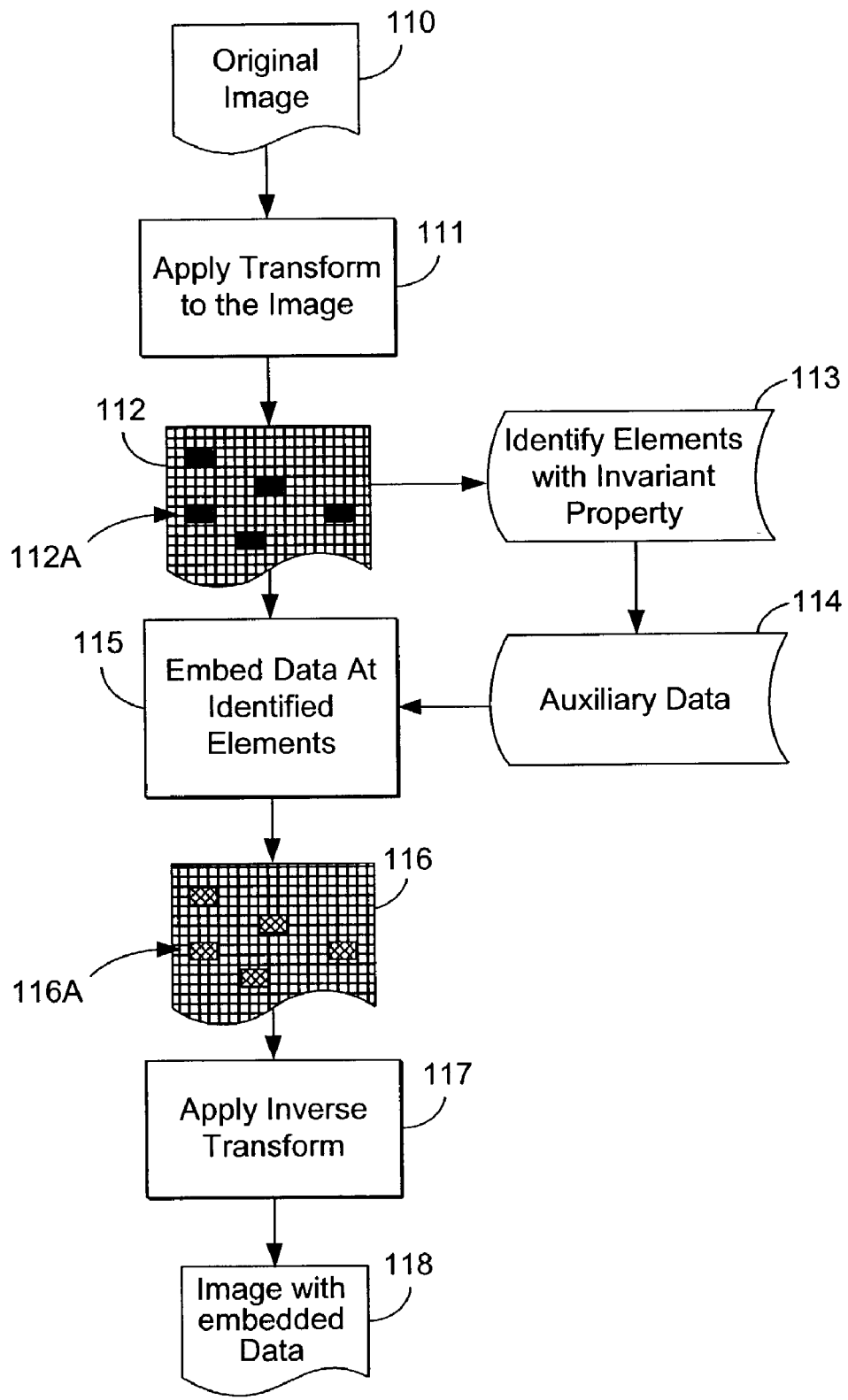
FIG. 1E is a diagram illustrating a reversible watermarking method used to select elements for embedding based on whether the element has a property that is invariant to the embedding operation.

FIG. 1E illustrates an embedding method that identifies data elements in an image that are invariant to auxiliary data embedding to enable the decoder to locate the embedded data. A similar approach may be used for embedding auxiliary data in other data types. First, as indicated by block 111, an optional transform is applied to an original image 110 to produce a transformed image 112. One example of this transform 111 calculates difference and average values for pairs of pixels in an image. Next as indicated by blocks 113, certain elements in the transformed image 112 are identified. The identified elements have a property that remains identifiable after they are changed by auxiliary data embedding. The identified elements are illustrated as blocks 112A. It should be understood that in a practical application, an image has many thousand of such elements. For convenience of illustration, only a few such elements 112A are illustrated in FIG. 1E.

An auxiliary data stream 114 is embedded in the image. The auxiliary data stream can include authentication data, payload data, and various other data elements. As indicated by block 115, the data stream 114 is embedded in the elements 112A of image 112 creating a new image 116, which has identifiable elements 116A. The elements 112A and the elements 116A have different values; however, they can be identified or picked out of all of the other elements in images 112 and 116, because the selection criteria uses a property which is invariant between the original elements and the elements that have been changed by the embedding process.

The embedding locations having the invariant property may be used to embed auxiliary data, such as a location map, that identifies further embedding locations.

Some embodiments of reversible watermarking embed values of the original image that are changed by bit substitution during the embedding operation as part of the auxiliary data stream. This is not required in all cases because some embedding operations, like the expansion embedding method, are invertible without storing original data values and can be made at some locations in a manner that retains the invariant property.

An inverse transform 117 (i.e. a transform that is the inverse of the transform 111) can be applied to image 116 to generate an embedded image 118 (i.e. an image with the auxiliary data embedded in it). The image 118 is shown with a shaded corner to indicate that image 118 includes embedded auxiliary data.

Figure 1F:
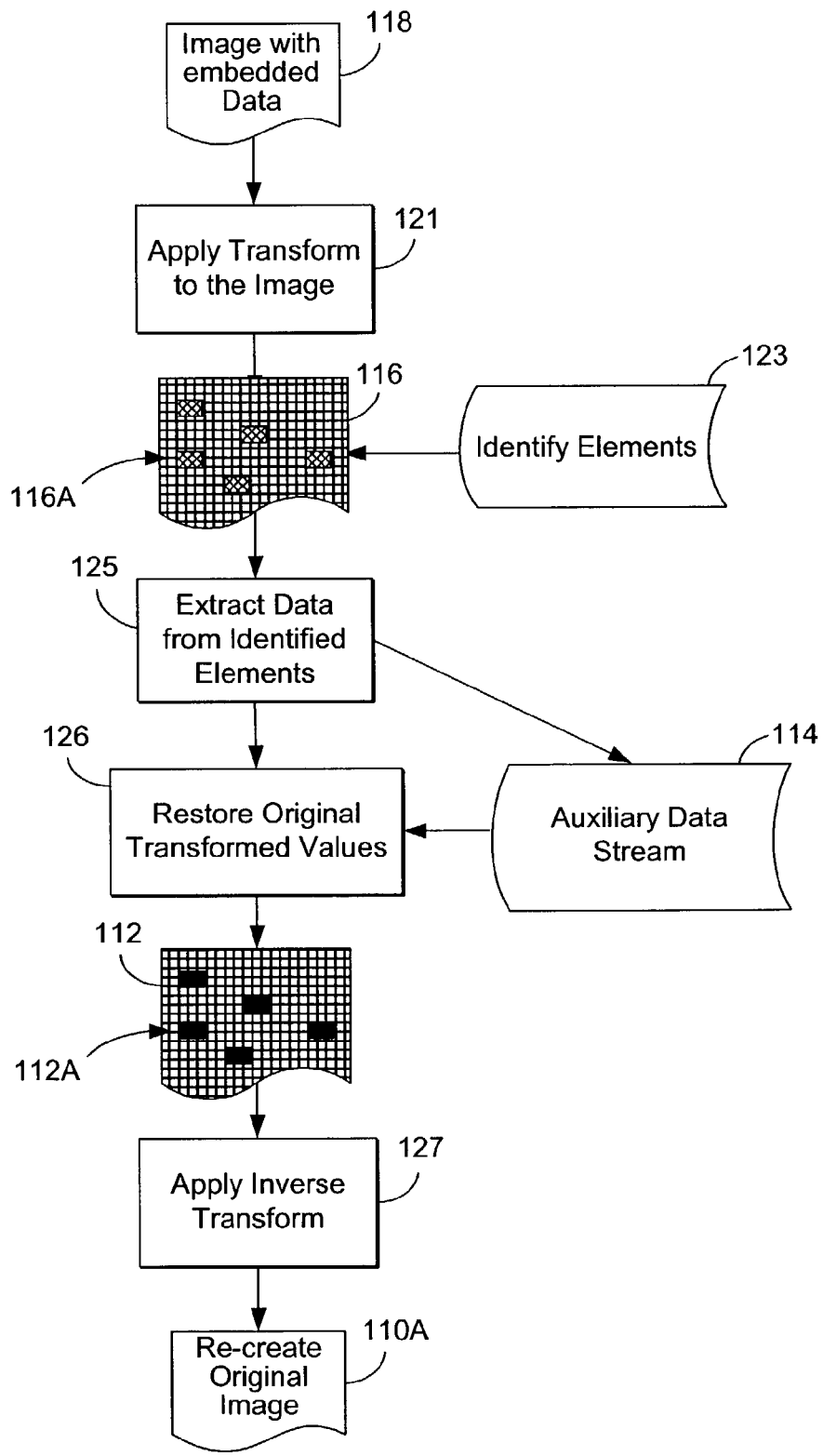
FIG. 1F is a diagram illustrating the decoding of a reversible watermark that takes advantage of the invariant property to identify embedded data locations.

The auxiliary data reading and image re-creation process is illustrated in block diagram form in FIG. 1F. First as illustrated by block 121, a transform is applied to the image with embedded data 118. The transform 121 is identical to the transform 111. Application of transform 121 produces a transformed image 116, which has identifiable elements 116A. These elements are identified using the same invariant criteria 123. As indicated by block 125, the data stream 114 is extracted from elements 116A. As indicated by block 126, the data from stream 114 is used to restore the transformed values of the image to their original values prior to auxiliary data embedding. In certain cases, this process of restoring the original values of the transformed data occurs as part of the auxiliary data extraction process of block 125. In other cases, certain changed bit values of elements 116A are replaced with original bit values carried in the auxiliary data stream. It is not necessary to carry original values of the image data in the auxiliary data stream when using embedding techniques, like expansion, that are invertible without requiring the auxiliary data to include the changed bits of the original image. As indicated by block 127, an inverse of transform 121 is applied to re-generate the original image now which is designated 110A in FIG. 1F. Not specifically shown in FIG. 1F, is the fact that data stream 114 can include a hash of the original image 110. One can generate a hash of the recreated original image 110A and compare it to the hash in data stream 114, to insure or guarantee that the image has been re-created precisely.

Figure 2A:
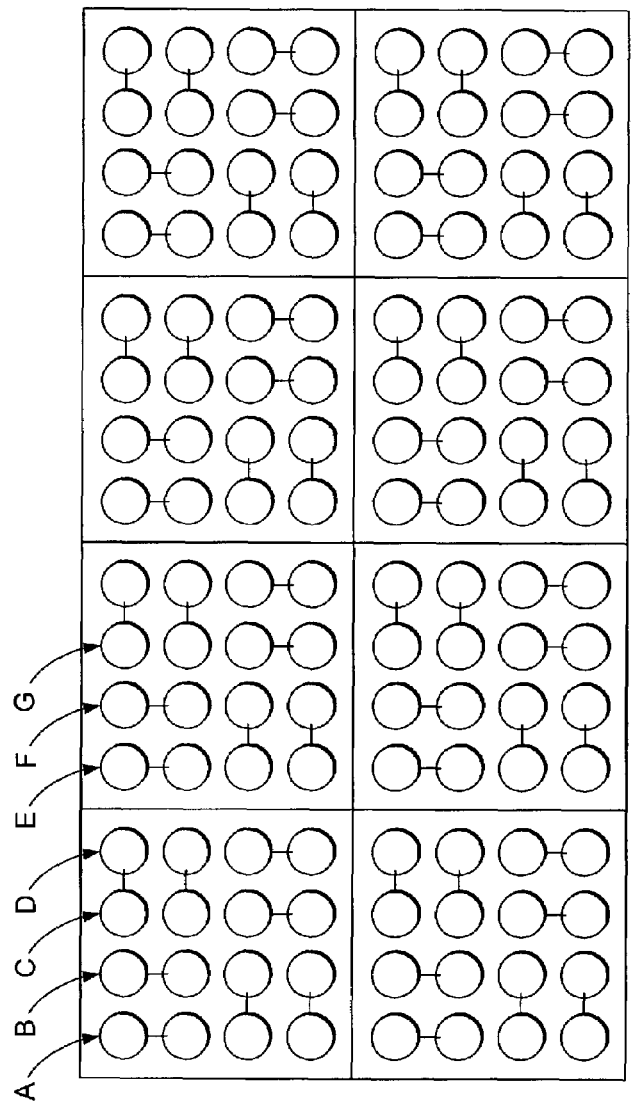
FIG. 2A is a diagram of an image showing a pattern of bit pairs.

In certain embodiments of our reversible watermarking method, an invertible transform divides the pixels in an image into pairs or groups of pairs according to a particular pattern. Factors to be considered in choosing these patterns include, for example, retaining perceptual quality of the image after embedding, increasing data capacity, etc. FIG. 2A illustrates (in greatly exaggerated form) the individual pixels in an image. Only a small portion of an image is shown. As is well known, any practical image would include many thousand such pixels. For convenience of illustration only a relatively few pixels are shown in FIG. 2A. It is also noted that in certain embodiments only the luminance values of the pixels are embedded with data. That is, the image is viewed as a gray scale image. Naturally, in color images there would also be color values. It should be understood that the digital watermark could alternatively be placed in other aspects of the image such as in the various color components and other transform domain sample value, like frequency domain values.

The purpose of FIG. 2A is to illustrate that the pixels are grouped into pairs in this example embodiment. For example, as shown in FIG. 2A, pixel C and D belong to the same pair. Any pattern of grouping can be used; however, the same pattern must be used in both the embedding and in the reading operations. While any pattern of paired pixels can be used, it is advantageous to use pairs that probably have similar values, that is, pairs that probably will have small difference numbers. Thus, in the preferred embodiment, adjacent pixels were chosen for members of each pair. In FIG. 2A, an alternating horizontal and vertical pattern was chosen to illustrate that the pattern can have a wide variety of arrangements.

In certain embodiments using difference expansion, two numbers are calculated for each pair of values in the image:
a) The average value of the two pixels, and
b) The difference between the values of the two pixels.

Transforming the image representation from a representation with an array of pixel values to a representation with an array of difference and average numbers is just one example of a transform or filter as indicated by block 111 in FIG. 1E. Other transformations may be made before this transform to place the original data in a format for embedding in other domains (e.g., a transform to a frequency domain, a transform a feature set, such as autocorrelation values or other statistical values).

In order to facilitate a discussion of additional embodiments, the following terms are defined as follows:
Average value: the average value of a group of two or more values.
Difference value: the difference between selected values in the group
Expandable value: a value that can be expanded without causing an overflow or underflow.
Expanded value: a value that has been expanded.
Changeable value: all expandable values and values that can be changed by bit substitution without causing an overflow or underflow.

These definitions are used only for the sake of explaining certain embodiments, and are not intended to be limiting.

Figure 2B:
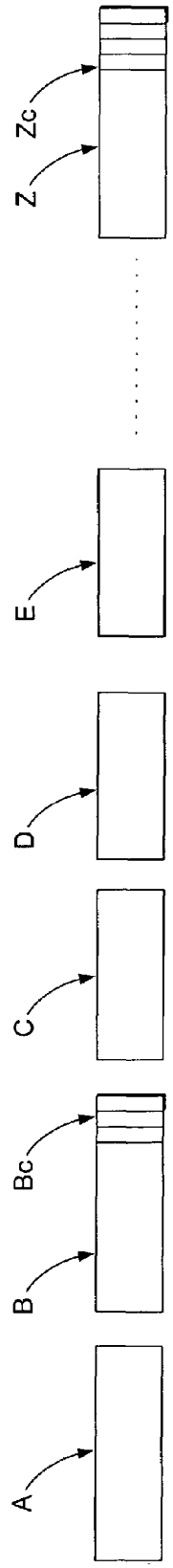
FIG. 2B is a diagram illustrating changeable and unchangeable bits in difference values.

FIG. 2B illustrates difference values A to Z to show examples of the various types of difference values that can exist in an image. Difference values A and C are difference values that are not changeable. Difference values B and Z are changeable, but not expandable. They have certain bits designated Bc and Zc that may be changed by bit substitution. Difference values D and E are expandable.

As a simple example consider the following. If a pair of pixels has grayscale values (61,76), the average value of the pair is 68.5 and the difference is 15. Only the integer part of the average, namely 68, need be considered. This integer part is computed using the floor function, for example. The difference value 15 can be expressed as a binary number with a minimum length. In such a representation, all leading "0"s in the binary representation are discarded. That is, the difference number 15 can be expressed as the binary number 1111.

With this example, a bit can be inserted in the difference number 1111 without causing an overflow. That is, where the difference number is 1111 and a 0 is inserted after the first 1, the number becomes 10111 or 23.

Given an average of 68.5 and a difference of 23, the pair of pixels must have the value 57 and 80. The average of 57 and 80 is 68.5 and the difference is 23. The above numbers may be easier to follow with the following table.

| Pixel values | Average | Difference | Difference value in binary |
|---|---|---|---|
| 61, 76 | 68.5 | 15 | 1111 |
| 57, 80 | 68.5 | 23 | 10111 |

It is noted other pairs of pixels values could have an average of 68; however, only the values 57 and 80 have an average of 68 (ignoring the fractional portion) and a difference of 23.

The following is another simple example to illustrate difference expansion. Assume that one has two grayscale values x=205 and y=200. We will illustrate below how one can embed one bit b=1, in a reversible way. First the integer average value l and the difference value "h" of x and y are computed as follows:

$$l = \left\lfloor \frac{x+y}{2} \right\rfloor = \left\lfloor \frac{205+200}{2} \right\rfloor = \left\lfloor \frac{405}{2} \right\rfloor = 202$$
$$h = x - y = 205 - 200 = 5$$

It is noted that the symbol $\lfloor \ \rfloor$ is the floor function meaning "the greatest integer less than or equal to". For example $\lfloor 2.7 \rfloor = 2$, and $\lfloor -5.2 \rfloor = -6$.

Next we represent the difference number h in its binary representation:

$$h = 5 = 101_2$$

Then we append b which equals 1 into the binary representation of h after the least significant bit (LSB), the new difference number h' will be:

$$h' = 101b_2 = 1011_2 = 11$$

The above is equivalent to:

$$h' = 2 \times h + b = 2 \times 5 + 1 = 11$$

Finally we can compute the new grayscale values, based on the new difference number h' and the original average number l, $$x' = l + \left\lfloor \frac{h'+1}{2} \right\rfloor = 202 + \left\lfloor \frac{11+1}{2} \right\rfloor = 208$$

$$y' = l - \left\lfloor \frac{h'}{2} \right\rfloor = 202 - \left\lfloor \frac{11}{2} \right\rfloor = 197$$

From the embedded pair x',y', we can extract the embedded bit b and restore the original pair x, y. To do this we again compute the integer average and difference as follows:

$$l' = \left\lfloor \frac{x'+y'}{2} \right\rfloor = \left\lfloor \frac{208+197}{2} \right\rfloor = 202$$

$$h' = x' - y' = 208 - 197 = 11$$

We now look at the binary representation of h'

$$h' = 11 = 1011_2$$

From the above we extract the LSB, which in this case is 1, as the embedded bit b which leaves the original value of the difference number as:

$$h = 101_2 = 5$$

the above is equivalent to:

$$b = LSB(h') = 1, \quad h = \left\lfloor \frac{h'}{2} \right\rfloor = 5.$$

With the original average value l and the restored difference number h, we can restore exactly the original grayscale valued pair, x,y.

In the above example, although the embedded pair (208, 197) is still 8 bits per pixel (bpp), one bit b has been embedded by increasing the valid bit length of the difference number h from 3 bits (for h=5) to 4 bits (for h'=11). This reversible data embedding operation h'=2×h+b is called difference expansion.

The reason that the valid bit length of the difference numbers h can be increased in images is because of the redundancy that exists in the pixel values of natural images. In most cases h will be very small and have a short valid bit length in its binary representation. However, in an edge area or an area containing lots of activity, the difference number h from a pair of grayscale values could be large. For example, if x=105, and y=22, then h=x−y=83. In such a situation if one wanted to embed a bit 0 into h by difference expansion, then h'=2×h+b=166. With l=63 being unchanged, the embedded pair will be x'=146 y'=−20. This will cause an underflow problem since grayscale values can only be in the range of [0, 255]. In the specific embodiments discussed below, the grayscale values selected for expansion are those grayscale values that can be expanded without causing an overflow or underflow condition.

Figure 3:
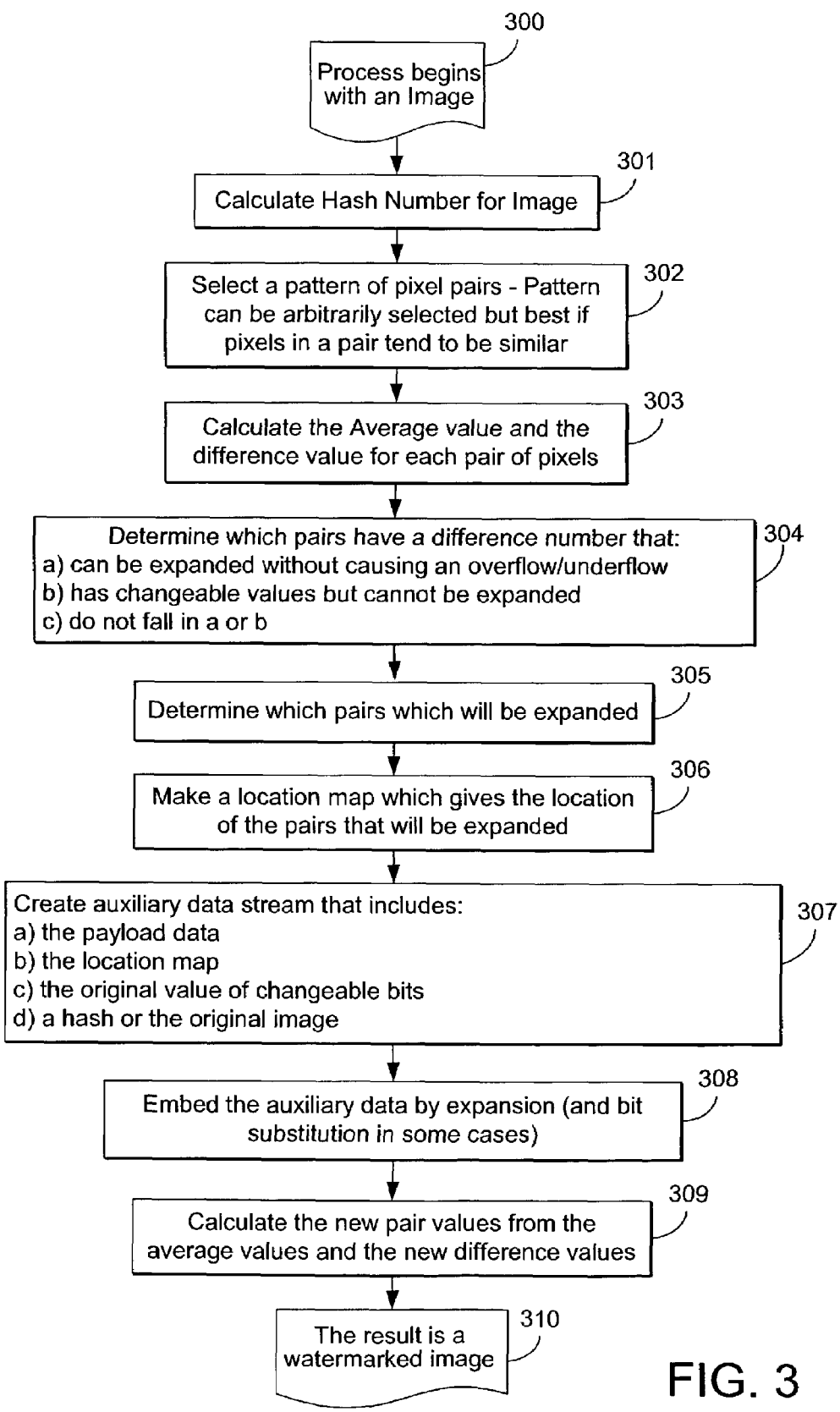
FIG. 3 is an overall block flow diagram of the watermark embedding process.
Figure 4:
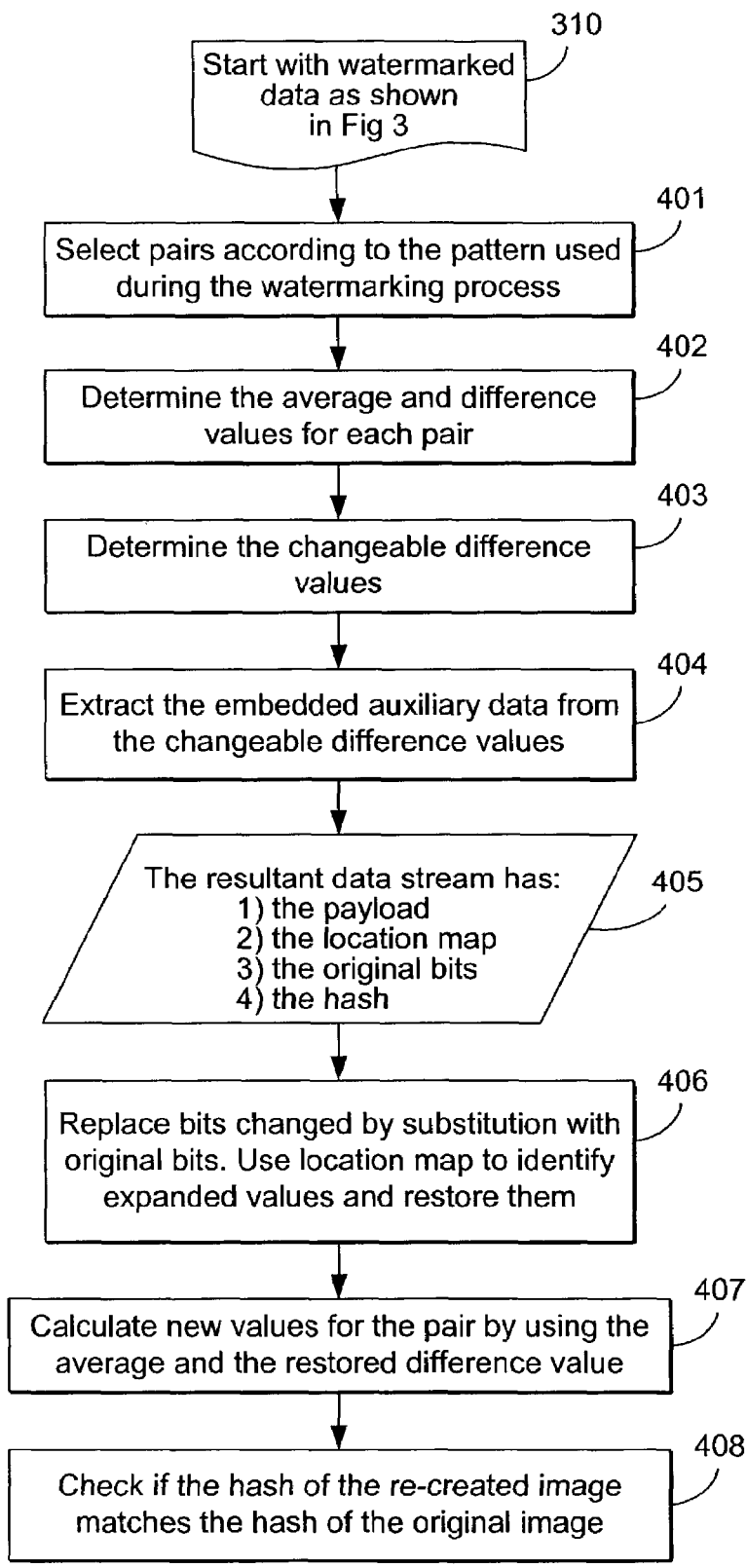
FIG. 4 is a block flow diagram of the watermark reading process.

The overall process used to watermark an image is illustrated in block diagram form in FIG. 3 and the overall process used to read a watermark and re-create an image is illustrated in FIG. 4. Each block in FIGS. 3 and 4 can be a subroutine in a program or digital circuit, or alternatively, a number of blocks can be performed by a single program subroutine or digital circuit.

As indicated by block 300, the process begins with an image which one wants to embed auxiliary data (e.g., a digital watermark). It is noted that in other embodiments, one could start with other types of data. For example, instead of starting with an image, one might start with a digitized file of audio data, video data, software, graphical model (e.g., polygonal mesh), etc.

As a first step (block 301) a hash number or other authentication data is generated for the image. This can be calculated by known techniques for calculating a hash number. It is noted that the size of a hash is much smaller than the size of the image. It is not necessarily a unique identification. However, a hash can authenticate an image with a very high confidence level.

Block 302 indicates that a pattern of pixel pairs is selected. It is desirable (but not absolutely necessary) that the values in each pair tend to be similar. The selection pattern illustrated in FIG. 2A is one example of selected pairs. Adjacent pairs have been selected since they more likely have relatively similar values. However, the particular pattern selected is arbitrary and a wide variety of different patterns could be used.

Next, as indicated by block 303, for each pair of pixels, two values are calculated. The average of the two pixel values of the pair is calculated and the difference between the pixel values in the pair is calculated.

The values of the pixel in each pair are then examined and the following is determined:

a) Those pairs that can be expanded without causing an overflow or underflow.

b) Those pairs that cannot be expanded, but which have bits that can be changed by bit substitution without causing an overflow or underflow.

c) Those pairs that do not fall into groups "a" or "b."

Various embodiments are described in detail below for selecting the expandable pairs. Note that the difference values of the pairs in sets "a" and "b" are both changeable in some fashion (by expansion or by bit substitution). The set of "changeable" difference values can be limited to those that have an invariant property to the embedding operation so that the decoder can identify embedding locations without use of data separate from the watermarked data.

As indicated by blocks 305 and 306, the particular pairs that will be expanded is determined and a location map is made which indicates which pairs will be expanded. For example, one simple way of making a location map is to have one bit for each pair that indicates whether the pair is expandable. Another way to make a location map is to store the index values of either the pairs that can be expanded or the indexes of the pairs that can not be expanded.

Next as indicated by block 307, a data stream (called the embedded data stream) is created. The embedded data stream may include:

a) The desired payload data (i.e. data which one desires to store in the watermark).

b) The location map (in some embodiments, the location map is compressed).

c) The original bits changed by bit substitution, and d) A hash number of the original image.

As indicated by block 308, the embedder embeds the auxiliary data stream using expansion (and in some cases, bit substitution). For certain expandable difference values, the embedder expands the difference value by multiplying the difference value by the desired number of states and adding the desired state. For example, in the case of two states, the embedder multiplies the expandable difference value by 2, shifting the bit positions toward the MSB, and the embedded bit value (0 or 1) is added in the bit position vacated by the shift. As indicated by block 309, the new difference values along with the original average values are used to calculate new values for each pair. In certain cases, the embedder replaces bits in certain difference values (e.g., those in set "b") by certain bits from the embedded data stream using bit substitution. The result is a watermarked image 310.

FIG. 4 shows auxiliary data decoder operations in the process of reading the auxiliary data and recreating the original, un-watermarked image. First as indicated by block 401, the values in the watermarked image are grouped into pairs using the same pattern as was used during the watermarking process. Next (block 402) the average and difference value of the pairs are calculated.

The changeable difference values are determined (block 403). The decoder can identify these values using a property invariant to the embedding operation, or using separate data (e.g., a separate location map).

As indicated by block 404, the changeable difference values are selected, and an auxiliary data stream is extracted. In this case, the auxiliary data embedded by expansion and by bit substitution is carried in the LSBs of the difference values, and as such, is easily separated from the changeable difference values. This extracted data is the embedded data stream previously discussed. The embedded data stream includes:

1) The payload
2) The location map that tells which pairs have been expanded (if not provided separately).
3) The original value of any bits, if any, changed by bit substitution
4) a hash of the original image (or other authentication data).

The length and position of each component in the embedded data stream is known (or it can be determined), hence, the embedded data stream can be separated into its component parts.

Block 406 indicates that the bits changed by bit substitution are replaced with the original bits in the embedded data stream. The location map is used to tell which pairs have been expanded. As indicated by block 406, the difference numbers for the pairs are processed in sequence. For each pair, any bits changed by bit substitution are replaced by corresponding original bits from the embedded data stream. If the location map indicates that a particular pair was expanded, the difference values are restored to their original values by inverting the expansion operation. For the case of binary embedding states, this operation shifts the bit positions back to their original position.

Finally, new values for each pair are calculated from the average values and the restored difference values for each pair (block 407). These new values are the newly re-created image as indicated by block 408.

As a final step, a hash number for the re-created image is calculated and compared to the hash number that was in the embedded data stream. If the two numbers match, the original image has been re-created perfectly.

Several specific embodiments of the invention will now be described in considerable mathematical detail. It is noted that in the following discussion, some equations are referred to by the number in parentheses that is to the right of the equation.

Details of First Specific Preferred Embodiment

The following is a more detailed description of a first specific preferred embodiment of the invention. This embodiment provides a high capacity and high quality reversible watermarking method based on difference expansion. A feature of the method is that it does not involve compressing original values of the embedding area.

The method described here can be applied to digital audio and video as well. This embodiment performs steps similar to those in FIG. 3. That is, the difference between neighboring pixel values are calculated (block 303). Some difference numbers are selected for difference expansion (block 305). The original values of difference numbers, the location of expanded difference numbers, and a payload are all embedded into the difference numbers (308). Extra storage space is obtained by difference expansion.

The described embodiment pertains to grayscale images. There are several options by which the technique can be applied to color images. One can de-correlate the dependence among different color components, and then reversibly watermark the de-correlated components. Or one can reversibly watermark each color component individually.

In this embodiment, a watermark is embedded in a digital image I, to create a watermarked image I'. The reversible watermark can be removed from I' to re-create the original image. The recreated image is called I". One can determine if the image I' was tampered with by some intentional or unintentional attack. This is done by comparing a hash of the original image I to a hash of the re-created image I". If there was no tampering, the retrieved image I" is exactly the same as the original image I, pixel by pixel, bit by bit.

The basic approach is to select an area of an image for embedding, and embed the payload. Difference expansion is used to embed the values in the image, and this eliminates the need for loss-less compression. The difference expansion technique discovers extra storage space by exploring the high redundancy in the image content.

This embodiment embeds the payload in the difference of neighboring pixel values. For a pair of pixels (x, y) in a grayscale image, x, y∈Z, 0≦x, y≦255, we define their average and difference as $$l = \left\lfloor \frac{x+y}{2} \right\rfloor, \quad h = x - y \qquad (1)$$

where the symbol $\lfloor \cdot \rfloor$ is the floor function meaning "the greatest integer less than or equal to". The inverse transform of (equation 1 above) is:

$$x = l + \left\lfloor \frac{h+1}{2} \right\rfloor, \quad y = l - \left\lfloor \frac{h}{2} \right\rfloor \qquad (2)$$

As grayscale values are bounded in [0,255], we have:

$$0 \le l + \left\lfloor \frac{h+1}{2} \right\rfloor \le 255, 0 \le l - \left\lfloor \frac{h}{2} \right\rfloor \le 255$$

which is equivalent to:

$$|h| \leq \min(2(255-l), 2l+1) \qquad (3)$$

Thus to prevent overflow and underflow problems, the difference number h (after embedding) satisfies Condition (3).

The least significant bit (LSB) of the difference number h will be the selected embedding area. As $$h = \left\lfloor \frac{h}{2} \right\rfloor \cdot 2 + LSB(h)$$

with LSB(h)=0 or 1, to prevent any overflow and underflow problems, we embed only in changeable difference numbers.

Definition of Changeable values: For a grayscale-valued pair (x, y), we say h is changeable if:

$$\left| \left\lfloor \frac{h}{2} \right\rfloor \cdot 2 + b \right| \leq \min(2(255-l), 2l+1)$$

for both b=0 and 1.

Using bit substitution for changeable h does not provide additional storage space. We gain extra storage space from expandable difference numbers.

Definition of Expandable values: For a grayscale-valued pair (x, y), we say h is expandable if $$|2 \cdot h + b| \leq \min(2(255-l), 2l+1)$$

for both b=0 and 1.

In the binary representation of integers, an expandable h could add one extra bit b after its LSB, with b=0 or 1. More precisely, h could be replaced by a new difference number h'=2h+b, without causing an overflow or underflow. Thus, for each expandable difference number, one could gain one extra bit. The reversible operation from h to h' is called difference expansion. An expandable h is also changeable. After difference expansion, the expanded h' is still changeable.

With this embodiment, more difference numbers will be changeable and/or expandable than in the fourth embodiment. Also note that if h=0 or −1, the conditions on changeable and expandable are exactly the same.

When this embodiment is applied to a digital image, the image is partitioned into pairs of pixel values. A pair comprises two pixel values or two pixels with a relatively small difference number. The pairing can be done horizontally, vertically, or by a key-based specific pattern. The pairing can be through all pixels of the image or just a portion of it. The integer transform (1) is applied to each pair. (it is noted that one can embed a payload with one pairing, then on the embedded image, we can embed another payload with another pairing, and so on.)

After applying transform 1, five disjoint sets of difference numbers, EZ, NZ, EN, CNE, and NC are created:
1. EZ: expandable zeros. For all expandable h∈{0,−1}
2. NZ: not expandable zeros. For all not expandable h∈{0,−1}
3. EN: expandable nonzeros. For all expandable h∉{0,−1}
4. CNE: changeable, but not expandable. For all changeable, but not expandable h∉{0,−1}
5. NC: not changeable. For all not changeable h∉{0,−1}

Each difference number will fall into one and only one of the above sets.

The next step is to create a location map of all expanded (after embedding) difference numbers as indicated by block 306 in FIG. 3. We partition the set EN into two disjoint subset EN1 and EN2. Every h in EN1, will be expanded; and every h in EN2, will not be expanded (though it is expandable). A discussion on how to select expandable h∉{0,−1} for difference expansion is given below. We create a one-bit bitmap, with its size equal to the numbers of pairs of pixel values. For the difference number in either EZ or EN1, we assign a value "1" in the bitmap; for the difference number in either NZ, EN2, CNE, or NC, we assign a value "0". Thus a value "1" will indicate an expanded difference number. The location map will be lossless compressed by a JBIG2 compression or run-length coding. The compressed bit stream will be denoted as L. An end of message symbol is appended at the end of L.

We collect original LSB values of difference numbers in EN2 and CNE. For each h in EN2 or CNE, LSB(h) will be collected into a bit stream C. An exception is when h=1 or −2, nothing will be collected.

With the location map L, the original LSB values C, and a payload P (which includes an authentication hash, for example, an SHA-256 hash), we combine them together into one binary bit stream B

B=LUCUP

Assuming b is the next bit in B, depending on which set h belongs to, the embedding (by replacement) will be EZ or EN1: h=2·h+b $$EN2 \text{ or } CNE: \quad h = \left\lfloor \frac{h}{2} \right\rfloor \cdot 2 + b$$

NZ or NC: no change on the value of h, b is passed to the next h

After all bits in B are embedded, we apply the inverse integer transform (2) to obtain the embedded image.

The bit stream B has a bit length of (|L|+|C|+|P|). Assume the total number of 1 and −2 in EN2 and CNE is N, as each expanded pair will give one extra bit. The total hiding capacity will be (|C|+N+|EZ|+|EN1|). Accordingly, to have B successfully embedded, we must have:

$$|L| + |C| + |P| \leq |C| + N + |EZ| + |EN1| \qquad (4)$$

i.e., $$|L| + |P| \leq N + |EZ| + |EN1| \qquad (5)$$

Note that if the bit stream C is loss-lessly compressed before embedding, then Condition (4) becomes $$|L| + \alpha|C| + |P| \leq |C| + N + |EZ| + |EN1|$$

where α is the achieved compression rate, 0<α≤1.

The partition of expandable $h \notin \{0,-1\}$ into EN1 and EN2 will be subject to Condition (5). We will give two designs, one for mean square error (MSE) consideration, and the other for visual quality consideration.

Assume after difference expansion, an expanded pair (x, y) becomes (x', y'), with the average number unchanged, $$(x-x')^2 + (y-y')^2 \approx 2(y-y')^2$$
$$= 2\left(\left\lfloor \frac{h}{2} \right\rfloor - \left\lfloor \frac{h'}{2} \right\rfloor\right)^2$$
$$= 2\left(\left\lfloor \frac{h}{2} \right\rfloor - \left\lfloor \frac{2 \cdot h + b}{2} \right\rfloor\right)^2$$
$$\approx \frac{h^2}{2}$$

Thus to minimize the mean square error, one should select h with small magnitudes for difference expansion. For example, one can pick a threshold T, and partition EN into EN1 and EN2 by checking whether the magnitude of h is less than or greater than T.

For the visual quality consideration, one can define a hiding ability of an expandable difference number, as follows.

Definition For an expandable difference number h, if k is the largest number such that:

$$|k \cdot h + b| \leq \min(2(255-l), 2l+1)$$

for all $0 \leq b \leq k-1$, then we say the hiding ability of h is $\log_2 k$.

The hiding ability tells us how many bits could be embedded into the difference number h without causing overflow and underflow. Thus for an expandable difference number h, it will be at least $\log_2 2 = 1$, since $k \geq 2$. The hiding ability could be used as a guide on selecting expandable difference numbers. In general, selecting an expandable difference number with large hiding ability will degrade less on the visual quality than an expandable difference number with small hiding ability. A large hiding ability implies that the average of two pixel values is close to mid tone, while their difference is close to zero.

For decoding, we do the pairing using the same pattern as in the embedding, and apply the integer transform (1) to each pair. Next we create two disjoint sets of difference numbers, C, and NC:

1. C: changeable. For all changeable h
2. NC: not changeable. For all not changeable h Then we collect all LSBs of difference numbers in C and form a binary bit stream B. From B, we first decode the location map. With the location map, we restore the original values of difference numbers as follows (assuming b is the next bit from B):

if h∈C, the location map value is 1, then $$h = \left\lfloor \frac{h}{2} \right\rfloor,$$

b is passed to the next h if h∈C, the location map value is 0, and $0 \leq h \leq 1$, then h=1, b is passed to the next h if h∈C, the location map value is 0, and $-2 \leq h \leq -1$, then h=-2, b is passed to the next h if h∈C, the location map value is 0, and $h \geq 2$ or $h \leq -3$, then $$h = \left\lfloor \frac{h}{2} \right\rfloor \cdot 2 + b$$

if h∉C, the location map value should be 0 (otherwise a decoding error on a tampered image), no change on h, b is passed to the next h After all difference numbers have been restored, we apply the inverse integer transform (2) to reconstruct a restored image. If the embedded image has not been tampered, then the restored image will be identical to the original image. To authenticate the content of the embedded image, we extract the embedded payload P from B, and compare the authentication hash in P with the hash of the restored image. If they match exactly, then the image content is authentic, and the restored image will be exactly the same as the original image. Most likely, a tampered image will not go through to this step because some decoding error could happen in restoring difference numbers. This decoding error indicates that the image has been tampered.

The above described embodiment provides a high capacity, high quality, reversible watermarking method. The method partitions an image into pairs of pixel values (block 302 in FIG. 3), selects expandable difference numbers for difference expansion (block 305 in FIG. 3) and embeds a payload that includes authentication data (e.g., block 308 in FIG. 3). By exploring the redundancy in the image, reversibility is achieved. As difference expansion brings extra storage space, compression is not necessary. Of course, employing compression can either increase the hiding capacity or reduce the visual quality degradation of watermarked image.

Detail of Second Embodiment

The following is a detailed explanation of a second embodiment of the invention. This embodiment involves a reversible data embedding method for digital images. However, the method can be applied to digital audio and video as well. This embodiment is an example of expansion using N states for auxiliary data values to be embedded, where the state N corresponds to the level number L.

In this embodiment, two mathematical techniques are utilized, namely, difference expansion and Generalized Least Significant Bit (G-LSB) embedding. This embodiment achieves a very high embedding capacity, while keeping the distortion low.

In this embodiment, as in the first embodiment, the differences of neighboring pixel values are calculated, and some difference numbers are selected for difference expansion. The original G-LSBs values of the difference numbers, the location of expanded difference numbers, and a payload (which includes an authentication hash of the original image) may all be embedded into the difference numbers as indicated by bloc 308 in FIG. 3. The needed extra storage space is obtained by difference expansion. With this embodiment, no compression is used.

This embodiment relates to watermarking a grayscale image. For color images, one can embed the data into each color component individually. Alternatively one can de-correlate the dependence among different color components, and then embed the data into the de-correlated components.

The overall operation is as follows: a payload is embedded in a digital image I, to create an embedded image I'. An image I" is retrieved from the embedded image I'. The retrieved image I" is identical to the original image I, pixel by pixel, bit by bit. One can determine if the image I' was tampered with by some intentional or unintentional attack using a content authenticator. The authenticator compares a hash of the original image I to a hash of the retrieved image I".

This embodiment uses a reversible integer transform.

The image being watermarked comprises grayscale-valued pairs (x, y).

Each x and y has a value from 0 to 255.

that is x, y∈Z, 0≦x, y≦255.

The average value "I" and difference value "h" of the pairs is defined $$l = \left\lfloor \frac{x+y}{2} \right\rfloor, \quad h = x - y \qquad (21)$$

where the symbol ⌊ ⌋ is the floor function meaning "the greatest integer less than or equal to". The inverse transform of equation 1 is:

$$x = l + \left\lfloor \frac{h+1}{2} \right\rfloor, \quad y = l - \left\lfloor \frac{h}{2} \right\rfloor \qquad (22)$$

In some of the literature, the reversible transform given in equations 21 and 22 above is called the Haar wavelet transform or the S transform.

The magnitude of the difference number h is used for embedding. Since grayscale values are in the range of 0 to 255, $$0 \le l + \left\lfloor \frac{h+1}{2} \right\rfloor \le 255, \quad 0 \le l - \left\lfloor \frac{h}{2} \right\rfloor \le 255$$

which is equivalent to:

$$|h| \le \min(2(255-l), 2l+1) \qquad (23)$$

Thus to prevent overflow and underflow problems, the difference number h (after embedding) satisfies Condition (23).

Given an integer L, L∈, L≧2. the (L-level) G-LSB, g, of a difference number h, is the remainder of its magnitude after dividing by L, $$g := |h| - \left\lfloor \frac{|h|}{L} \right\rfloor \cdot L$$

The G-LSB g is the selected embedding area for this embodiment. In order to prevent any overflow and underflow problems during embedding, embedding only takes place in the changeable difference numbers defined as follows:

For a grayscale-valued pair (x,y), the difference number h is L-changeable if:

$$\left\lfloor \frac{|h|}{L} \right\rfloor \cdot L + 1 \le \min(2(255-l), 2l+1)$$

During data embedding, the G-LSB g might be replaced by a value from the remainder set {0, 1, . . . L−1}. In view of constraint set out in equation 23 above, some large remainders might cause an overflow or an underflow. Thus we replace g with a value from the partial remainder set {0, 1 . . . M}, with g≦M≦L−1, where M is determined by: I and $$\left\lfloor \frac{|h|}{L} \right\rfloor$$

It is noted that modifying G-LSBs of L-changeable h (without compression) does not provide extra storage space. With this embodiment, extra storage space is gained from the expandable difference numbers.

In this embodiment, for a particular grayscale pair (x,y), a difference number h is called L-expandable if:

$$|h| \cdot L + 1 \le \min(2(255-l), 2l+1)$$

In a base L representation, an L-expandable h can add one extra number b after its G-LSB. More precisely, h could be replaced by a new difference number h', without causing an overflow or underflow where h' is defined by:

$$h' = \text{sign}(h) \cdot (|h| \cdot L + b)$$

Again, due to the constraint in equation 23 above, b could be a value from a partial remainder set {0, 1, . . . M) with 1≦M≦L−1 and M is determined by I and $$\left\lfloor \frac{|h|}{l} \right\rfloor.$$

Thus, for each L-expandable difference number, one could gain $\log_2(M+1)$ extra bits. The reversible operation h to h' is termed "difference expansion". An L-expandable h is also L-changeable. After difference expansion, the expanded h' is still L-changeable.

For h<0, we can alternatively define L-changeable (and L-expandable) as:

$$\left\lfloor \frac{|h|}{L} \right\rfloor \cdot L + 1 \le \min(2(255-l), 2l+1)$$

The Embedding Algorithm: A watermark is embedded in an image using the above described technique using the following procedure. First, The image is partitioned into pairs of pixel values as indicated by block 302 in FIG. 3. A pair of pixels comprises two neighboring pixel values or two pixels with a small difference number as indicated in FIG. 2A. The pairing could be through all pixels of the image or just a portion of it. The integer transform (equation 21) is applied to each pair.

In order to achieve maximum embedding capacity, one can embed a payload with one pairing, then embed another payload with another pairing on the embedded image. For example, we could embed column wise first, then embed row wise.

After applying the integer transform (equation 21) to each pair, five sets of difference numbers designated EZ, NZ, EN, CNE, and NC are created using the above definitions of changeable and L-expandable as follows:
1. EZ: expandable zeros. For all L-expandable where h=0.
2. NZ: not expandable zeros. For all not L-expandable where h=0.
3. EN: expandable non zeros. For all L-expandable h≠0.
4. CNE: changeable, but not expandable. For all L-changeable, but not L-expandable h≠0.
5. NC: not changeable. For all not L-changeable h≠0.

Each difference number will fall into one and only one of the above sets.

The next step (block 306 in FIG. 3) is to create a location map of all expanded (after embedding) difference numbers. The set EN is partitioned into two disjoint subset EN1 and EN2. Every h in EN1, will be expanded; every h in EN2, will not be expanded. (It is noted that to achieve maximum embedding capacity, EN1 would include the whole set EN, and EN2 will be empty).

A one-bit bitmap is created. Its size is equal to the numbers of pairs of pixel values (block 302 in FIG. 3). For an h in either EN1 or EZ, a value 1 is assigned in the bitmap; otherwise a 0 is assigned. Thus, a value 1 indicates an expanded difference number. The location map is then loss less compressed by a JBIG2 compression or by run length coding. The compressed bit stream is denoted as L'. An end of message symbol is appended at the end of L'.

Next, we collect the original values of G-LSBs of the difference numbers in EN2 and CNE. For each h in EN2 or CNE, its G-LSB g is collected into a bit stream C. We employ a conventional L-ary to Binary conversion method to convert g to a binary bit stream.

The L-ary to Binary conversion is a division scheme of unit interval, similar to arithmetic coding. Since h is L-changeable, we determine M, where g could be replaced by a value from $\{0, 1, \ldots M\}$ without causing an overflow or underflow. We convert g to the interval:

$$\left[\frac{g}{M+1}, \frac{g+1}{M+1}\right)$$

The interval is further refined by the next G-LSBs, and so on, until we reach the last G-LSB. Then we decode the final interval to a binary bit stream. By using L-ary to Binary conversion, instead of simply using a fixed length binary representation of g, the representation of G-LSBs is more compact, which results in a smaller bit stream size of C.

It is noted that when L=2, as M will always be 1, there will be no need for the L-ary to Binary conversion. It is also noted that if $|h|\leq L-1$, after its g is collected, we also store its sign, sign(h), in the bit stream C.

Finally, (as indicated by block 308 in FIG. 3) we embed the location map L', the original values of G-LSBs C, and a payload P (which includes an authentication hash, for example, an SHA-256 hash). We combine them together into one binary bit stream S,

S=L'UCUP

We use the inverse L-ary to Binary conversion to convert the binary bit stream S to M-ary, with M determined for each expandable difference number in EZ and EN1, and each changeable difference number in EN2 and CNE. The embedding (by replacement) is:
EZ: |h| =b, where b is the M-ary symbol from the inverse L-ary to Binary conversion, and the sign of h is assigned pseudo randomly.
EN1: h=sign(h)·(|h|·L+b).

$$EN2 \text{ or } CNE: \quad h = \text{sign}(h) \cdot \left(\left\lfloor \frac{|h|}{L} \right\rfloor \cdot L + b\right).$$

NZ or NC: no change on the value of h.

After all embedding is done, we apply the inverse integer transform (equation 22) to obtain the embedded image.

The Decoding Algorithm: The decoding process uses the same principles as the embedding process. First, we do pairing of pixels using the same pattern as in the embedding as indicated by block 401 in FIG. 4. The integer transform (equation 21) is applied to each pair.

Next two disjoint sets of difference numbers, C, and NC are created as follows:
1. C: changeable. For all L-changeable h.
2. NC: not changeable. For all not L-changeable h.

Next we collect all G-LSBs of difference numbers in C. We employ the L-ary to Binary conversion to convert it into a binary bit stream B. From the binary bit stream, we first decode the location map. With the location map, we restore the original values of difference numbers as follows:
a) if h∈C, and the location map value is 1, then $$h = \text{sign}(h) \cdot \left\lfloor \frac{|h|}{L} \right\rfloor$$

b) if h∈C, and the location map value is 0, and h=0, decode an M-ary symbol b from B, and decode a sign value s from B, then h=s·b.
c) if h∈C, the location map value is 0, and $1\leq|h|\leq L-1$, then h=sign(h)·b, and the next sign value from B should correctly match sign(h).
d) if h∈C, the location map value is 0, and |h|>L, $$h = \text{sign}(h) \cdot \left(\left\lfloor \frac{|h|}{L} \right\rfloor \cdot L + b\right)$$

e) if h∈NC, the location map value should be 0, no change on the value of h.

After all difference numbers have been restored, we apply the inverse integer transform (equation 22) to reconstruct a restored image. If the embedded image has not been tampered, then the restored image will be identical to the original image. To authenticate the content of the embedded image, we extract the embedded payload P from B. The authentication hash in P is compared with the hash of the restored image. If they match exactly, then the image content is authentic, and the restored image will be exactly the same as the original image. (Most likely a tampered image would not go through to this step because some decoding error could happen before this step indicating a tampered image.)

For the maximum embedding capacity all expandable difference numbers (EN1=EN) are expanded and the location map is loss less compressed by JBIG2. For more capacity and for other reasons, one can first embed with the column wise pairing, then embed with the row wise pairing on the column wisely embedded image.

To embed a payload with a smaller size than the maximum embedding capacity, one can reduce the size of EN1, until the targeted embedding capacity is met. For example, to embed a payload of 138856 bits in a particular image in which there are 116029 expandable non-zeros at L=2 with column wise pairing. One can assign 106635 of them in EN1, and the rest in EN2. The PSNR of the embedded image is then higher than some other methods with a payload of the same size.

The above described embodiment provides a high capacity reversible data embedding algorithm. The difference expansion provides extra storage space, and compression on original values of the embedding area is not needed. With compression (such as a linear prediction and entropy coding), the maximum embedding capacity will be even higher, at the expanse of complexity.

Third Embodiment

The third embodiment uses the same reversible integer transform as used in the first and second embodiment and which is given by equations 1, 21, 2 and 22 above. Furthermore to prevent overflow and underflow conditions:

$$0 \leq l + \left\lfloor \frac{h+1}{2} \right\rfloor \leq 255, \text{ and } 0 \leq l - \left\lfloor \frac{h}{2} \right\rfloor \leq 255$$

since l and h are integers, the above is equivalent to:

$$|h'| \leq 2(255 - l), \text{ and } |h| \leq 2l + 1 \qquad (33)$$

Condition (33) sets a limit on the magnitude (absolute value) of the difference number h. As long as h is in such range, it is guaranteed that (x, y) computed from Equation 2 or 22 will be a grayscale value. Condition given by equations 33 above are equivalent to:

$$|h'| \leq 2(255 - l), \text{ if } 128 \leq l \leq 255$$

$$|h| \leq 2l + 1, \text{ if } 0 \leq l \leq 127$$

For this embodiment Expandable and Changeable difference numbers are defined as follows: When a bit b is embedded into a difference number h by difference expansion, the new difference number h' is:

$$h' = 2 \times h + b$$

In accordance with equation 33 above, in order to prevent overflow and underflow, h' must satisfy the following conditions.

$$|h| \leq \min(2(255 - l), 2l\_ + 1$$

Definition of Expandable Difference number: for a grayscale-valued pair (x,y), which are members of a set Z and where $0 \leq x, y \leq 255$, we define the average and difference:

$$l = \left\lfloor \frac{x+y}{2} \right\rfloor, h = x - y$$

as previously explained

The difference number h is expandable under l for both b=0 and 1 if:

$$|2 \times h + b| \leq \text{Min}(2(255 - l), 2l + 1)$$

It is noted that since an expansion does not change the average number l, so for simplicity and brevity, we say h is expandable, as an abbreviation of saying h is expandable under l.

For an expandable difference number h, if we embed a bit by difference expansion, the new difference number h' still satisfied conditions 33. so the new pair computed from equation 2 above is guaranteed to be a grayscale value. Thus expandable difference numbers are candidates for difference expansion.

As each integer can be represented by the sum of a multiple of 2, and its LSB (least significant bit), for new, expanded difference number h':

$$h' = 2 \times \left\lfloor \frac{h'}{2} \right\rfloor + LSB(h') \text{ with } LSB(h') = 0 \text{ or } 1.$$

If we modify its LSB:

$$g = 2 \times \left\lfloor \frac{h'}{2} \right\rfloor + b'$$

with b'=0 or 1, then $$|g| = \left|2 \times \left\lfloor \frac{h'}{2} \right\rfloor + b'\right| = \left|2 \times \left\lfloor \frac{2 \times h + b}{2} \right\rfloor + b'\right| =$$

$$|2 \times h + b'| \leq \min(2(255 - l), 2l + 1)$$

Thus after difference expansion, the new difference number h' could have its LSB modified, without causing an overflow or underflow. We call such a difference number changeable.

Definition of Changeable difference number: for a grayscale-valued pair (x,y), which are members of a set Z and where $0 \leq x, y \leq 255$, we define the average l and difference h as:

$$l = \left\lfloor \frac{x+y}{2} \right\rfloor, h = x - y$$

as previously explained

In this embodiment, the difference number h id defined as changeable if:

$$\left|2 \times \left\lfloor \frac{h}{2} \right\rfloor + b\right| \leq \min(2(255 - l), 2l + 1)$$

for both b=0 and 1/

From the above it follows that:
1) If a difference number h is a positive odd number or a negative even number, it is always changeable.
2) For a changeable difference number, after its LSB is modified, it is still changeable.
3) An expandable difference number h is always changeable.
4) After difference expansion, the new difference number h' is changeable.
5) If h=0 or −1, the conditions on expandable and changeable are equivalent.

The Location Map: One can select some expandable difference numbers, and embed one bit into each of them. However to extract the embedded data and restore the original grayscale values, the decoder needs to know which difference numbers has been selected for difference expansion. To facilitate identification of expanded values, we can embed such location information, such that the decoder could access and employ it for decoding. For this purpose, we create and embed a location map, which includes the location information of all selected expandable difference numbers.

The data embedding Algorithm: The location map allows the encoder and the decoder to share the same information concerning which difference numbers have been selected for difference expansion. While it is straightforward for the encoder, the decoder needs to know where (from which difference numbers) to collect and decode the location map.

After difference expansion, the new difference number h' might not be expandable. On the decoder side, to check whether h' is expandable does not tell whether the original h has been selected for difference expansion during embedding. As we know, the new difference number h' is changeable, so the decoder could examine each changeable difference number. With the technique described here, the encoder selects changeable difference numbers as the embedding area. The decoder uses the same data to decode. During data embedding, all changeable difference numbers are changed, by either adding a new LSB (via difference expansion) or modifying its LSB. To guarantee an exact recovery of the original image, we will embed the original values of those modified LSBs.

In brief, data embedding algorithm used by this embodiment includes six steps: calculating the difference numbers, partitioning difference numbers into four sets, creating a location map, collecting original LSB values, data embedding by expansion, and finally an inverse integer transform. Each of these steps is discussed below.

The original image is grouped into pairs of pixel values. A pair comprises two neighboring pixel values or two with a small difference number. The pairing could be done horizontally by pairing the pixels on the same row and consecutive columns; or vertically on the same column and consecutive rows; or by a key-based specific pattern. For example, FIG. 2A show a pairing pattern that could be utilized. The pairing could be through all pixels of the image or just a portion of it.

The integer transform (equation 1 above) is applied to each pair. Then we design a scanning order for all the difference numbers h, and order them as a one dimensional list $\{h_1, h_2, \ldots h_M\}$.

Next, four disjoint sets of difference numbers are created, namely EZ, EN, CNE, and NC:

1) EZ: expandable zeros (and minus ones). For all expandable h=0 and expandable h=−1.
2) EN: expandable non-zeros. For all expandable h that are not a member of the set $\{0,-1\}$
3) CNE: changeable, but not expandable. For all changeable, but non-expandable h.
4) NC: not changeable. For all non-changeable h.

Each difference number will fall into one and only one of the above four sets. Since an expandable difference number is always changeable, the whole set of expandable difference numbers is EZ∪EN, and the whole set of changeable difference numbers is EZ∪EN∪CNE.

The third step is to create a location map of selected expandable difference numbers. For a difference number h in EZ, it will always be selected for difference expansion. For EN, we partition it into two disjoint subset EN1 and EN2. For every h in EN1, it will be selected for difference expansion; for every h in EN2, it will not (though it is expandable). A discussion on how to partition EN is given below. A one-bit bitmap is created vas the location map, with its size equal to the numbers of pairs of pixel values (in Step 1). For example, if we use horizontal pairing through all pixels, the location map will have the same height as the image, and half the width. For an h in either EZ or EN1, we assign a value 1 in the location map; for an h in EN2, CNE, or NC, we assign a value 0. Thus a value 1 will indicate a selected expandable difference number. The location map will be lossless compressed by a JBIG2 compression or run-length coding. The compressed bit stream is denoted as L. An end of message symbol is at the end of L.

In the fourth step, the original LSB values of difference numbers are collected in EN2 and CNE. For each h in EN2 or CNE, LSB(h) will be collected into a bit stream C. An exception is when h=1 or −2, nothing will be collected, as its original LSB value (1 and 0, respectively) could be determined by the location map information. (see the decoding section below for an explanation).

Fifth, we embed the location map L, the original LSB values C, and a payload. The payload P includes an authentication hash (for example, a 256 bits SHA-256 hash). The payload size (bit length) is limited by the embedding capacity limit discussed below. We combine L, C, and P together into one binary bit stream B, $$B = L \cup C \cup P = b_1, b_2 \ldots b_M$$

where: $b_i \in \{0,1\}, 1 \leq i \leq m$, m is the bit length of B. We append C to the end of L and append P to the end of C. The bit stream B is embedded into the difference numbers as follows.

1) Set i − 1 and j 0.
2) While (i ≤ m)
   • j = j + 1.
   • If $h_j \in$ EZ or $h_j \in$ EN1
      • $h_j = 2 \times h_j | b_i$.
      • i = i + 1.
   • Elseif $h_j \in$ EN2 or $h_j \in$ CNE
      • $h_j = 2 \times [h_2/h] + b_i$.
      • i = i + 1.
3) End Only changeable difference numbers (set EZ∪EN∪CNE) are modified, non-changeable difference numbers and all average numbers are unchanged. For a changeable difference number, either a new LSB is embedded by difference expansion (if it is in EZ or EN1) or its original LSB is replaced (if it is in EN2 or CNE). Thus after embedding, all the embedded information are in the LSBs of changeable difference numbers. By collecting the LSBs of changeable difference numbers, the decoder will be able to recover the embedded bit stream B Finally after all the bits in B are embedded, the inverse integer transform (equation 2 above) is applied to obtain the embedded (watermarked) image.

Capacity Limit: The bit stream B has a bit length of (|L|+|C|+|P|) where |.| is the cardinality (bit length or numbers of elements) of a set. The total embedding capacity is $$(|EZ| + |EN1| + |EN2| + |CNE|).$$

For successful embedding we must have:

$$|L| + |C| + |P| \leq |EZ| + |EN1| + |EN2| + |CNE|$$

Assume the total number of 1 and −2 in EN2 and CNE is N, then $$|P| \leq |EZ| + |EN1| + N - |L| \tag{35}$$

The payload size is upper bounded by the sum of the number of selected expandable difference numbers and the number of not selected or not expandable h∈{1,−2}, minus the bit length of the location map.

Difference Number Selection: Due to the redundancy in pixel values of natural images, the difference numbers of neighboring pixel values are usually small. For a pair of two pixel values, if their integer average is in the range of [30, 225], and their difference number is in the range of [−29, 29], then:

$$|2 \times h | b| \leq 2 \times |h| + |b| \leq 2 \times 29 | 1$$

$$= 59 < 60 \leq \min(2(255 - l), 2l + 1),$$

for both b=0 and 1, and the difference number h is expandable.

Since most integer averages and difference numbers will be in such ranges, most difference numbers will be expandable. We have found that, in general, many natural grayscale images usually have over 99% expandable difference numbers. If all expandable difference numbers are selected for difference expansion, the location map is very compressible (as over 99% values are 1), the embedding capacity limit will be close to 0.5 bpp. When the payload has a bit length less than the capacity limit, we only need to select some expandable difference numbers for difference expansion.

With a given payload P, the selection of expandable difference numbers in EN for difference expansion is constrained by condition (35) above. We present two simple selection methods here, one for mean square error (MSE) consideration, and the other for visual quality consideration.

For a grayscale-valued pair (x, y), assume the new grayscale valued pair after difference expansion is (x', y'). Since the average number I is unchanged, and we have:

$$(x - x')^2 - (y - y')^2 \approx 2 \times (y - y')^2$$

$$= 2 \times \left(\left(l - \left\lfloor\frac{h}{2}\right\rfloor\right) - \left(l - \left\lfloor\frac{h'}{2}\right\rfloor\right)\right)^3$$

$$= 2 \times \left(\left\lfloor\frac{h}{2}\right\rfloor - \left\lfloor\frac{h'}{2}\right\rfloor\right)^3$$

$$= 2 \times \left(\left\lfloor\frac{h}{2}\right\rfloor - \left\lfloor\frac{2 \times h + b}{2}\right\rfloor\right)^2 \approx \frac{h^2}{2}.$$

Thus the Euclidean distance between the original pair (x, y) and the new, expanded pair (x', y') is proportional to the difference number h (before difference expansion). To minimize the MSE between the original image and the embedded image, we should select h with small magnitudes for difference expansion. We choose a threshold T, and partition EN into EN1 and EN2 by $$EN1 = \{h \in EN : |h| \leq T\}, EN2 = \{h \in EN : |h| > T\}.$$

For a payload P, we start with a small threshold T, then increase T gradually until Condition (35) above is met. One could preprocess an image and create a threshold vs. capacity limit table, by calculating (|EZ|+|EN1|+N−|L|). When proceeding to embed a payload, one could check this table and pick an appropriate threshold.

For the visual quality consideration, we can define a hiding ability of an expandable difference number, as follows. If k is the largest integer such that:

$$|k \times h + b| \leq \min(2(255 - l), 2l + 1),$$

for all 0≤b≤k−1, we can say the hiding ability of h is $\log_2 k$.

For a difference number h with hiding ability $\log_2$ k, we can replace h with a new difference number k×h+b, where b∈{0 . . . k−1}, without causing an overflow or underflow. This means we could reversibly embed $\log_2$ k bits. For an expandable difference number, as k will be at least 2, its hiding ability will be at least $\log_2$ 2=1. Although with this embodiment we do not embed more than one bit into a difference number, the hiding ability could be used as a guide on selecting expandable difference numbers for difference expansion.

In general, selecting an expandable difference number with large hiding ability will degrade less on the visual quality than an expandable difference number with small hiding ability. A large hiding ability implies that the average of two pixel values is close to mid tone, while their difference is close to zero. Again we can choose a threshold T, and partition EN into EN1 and EN2 by:

$$EN1 = \{h \in EN : HidingAbility(h) \geq T\},$$

$$EN2 = \{h \in EN : HidingAbility(h) < T\}.$$

It should be noted that with a different threshold T in the above two selection methods, the location map L also changes, so does its bit length C. Thus a third method to partition EN could be based on the compressibility of the location map. We could select expandable difference numbers such that the location map is more compressible by lossless compression.

JBIG2 Compression: The location map (before loseless compression) is a one-bit bitmap. It can be efficiently compressed by JBIG2, the new international standard for lossless compression of bi-level images. JBIG2 supports model-based coding to permit compression ratios up to three times those of previous standards for lossless compression. For more details on JBIG2, we refer to an article by P. G. Howard, F. Kossentini, B. Martins, S. Forchammer, and W. J. Rucklidge, "The emerging JBIG2 standard" *IEEE Transactions on Circuits and systems for Video Technology,* vol. 8, no. 7 pp 838-848, 1998. For our reversible data embedding method, we can employ a slightly modified and more compact JBIG2 encoder and decoder, as we can discard most of the header information in the standard JBIG2 bit stream.

It should be noted that the last two bytes of the JBIG2 bit stream are the end of message symbol. The second to last byte will always be 255, and the last byte will be greater than 143 (it is 173 in a JBIG2 bit stream from Power JBIG-2 encoder developed by the University of British Columbia). With the end of message symbol, our decoder can separate the location map C from the next bit stream C easily.

Multiple Embedding: It is possible to employ the technique described here to an image more than once for multiple embedding. For an already embedded image, we can embed it again with another payload. Even for one payload, we can divide the payload into several pieces and use multiple embedding to embed them. As we have a choice of pairing of pixel values in Step 1 during embedding, we can use a different pairing for each embedding. One approach is to use a complement pairing. For example, if the image is embedded with a horizontal pairing, then we can use a vertical pairing for the next embedding. Other approaches are also possible. As each embedding has an embedding capacity limit less than 0.5 bpp, a multiple embedding will have an embedding capacity limit less than M/2 bpp, where M is the number of embedding.

In order to assist the decoder to determine whether or not there has been multiple embedding, one can embed header information before the location map G. The bit stream B now becomes:

B='HULUCUP,
where H is a 16 bit header. For the original image (first embedding), H is set to 0. The pairing pattern of the original image will be the H at the second embedding. The pairing pattern of the second embedding will be the H at the third embedding, and so on. For a 16 bit H we have $2^{16}-1=65535$ different pairing patterns to choose from.

Security: For security, the bit stream B can be encrypted by the Advanced Encryption Standard (AES) algorithm prior to embedding.

Decoding and authentication: The LSBs of changeable difference numbers are collected from the bit stream B. By collecting LSBs of all changeable difference numbers, we can retrieve the bit stream B. From B, we can decode the location map L and the original LSBs values C. The location map gives the location information of all expanded difference numbers. For expanded difference numbers, an (integer) division by 2 will give back its original value; for other changeable difference numbers, we restore their original LSB values from the bit stream C. After all changeable difference numbers have restored their original values, we can restore the original image exactly, as non-changeable difference numbers and all average numbers are unchanged during embedding.

The decoding and authentication process consists of five steps. First we calculate the difference numbers. For a (possibly) embedded (and possibly tampered) image, we do the pairing using the same pattern as in the embedding, and apply the integer transform (1) to each pair. We use the same scanning order to order all difference numbers as a one dimensional list $\{h_1, h_2, \ldots h_M\}$.

Next we create two disjoint sets of difference numbers, C, and NC:

1) C: changeable. For all changeable h.

2) NC: not changeable. For all non-changeable h.

Note that we do not need to examine expandability at the decoder.

Third we collect all LSB values of difference numbers in C, and form a binary bit stream $B=b_1 b_2 \ldots b_m$.

Fourth, we decode the location map from B by JBIG2 decoder. Since the JBIG2 bit stream has an end of message symbol at its end, the decoder knows exactly the location in B, where it is the last bit from the embedded location map bit stream L.

In this embodiment, we assume the first s bits in B are the location map bit stream L (including the end of message symbol). Thus the embedded original LSB values C starts from the (s+1)-th bit in B. We restore the original values of difference numbers as follows.

1) Set i = s + 1.
2) For j = 1:n
. If $h_j \in C$
. If the location map value is $h_j$ is 1

$$h_j = \left\lfloor \frac{h_j}{2} \right\rfloor.$$

. Else
. If $(0 \leq h_j \leq 1)$
. $h_j = 1$.
. Elseif $(-2 \leq h_j \leq -1)$
. $h_j = -2$.
. Else $$h_j = 2 \times \left\lfloor \frac{h_j}{2} \right\rfloor + b_i.$$

. $i = i + 1$.
3) End

If the location map value is 1, the difference number has been expanded during embedding. Conversely, for a non-changeable difference number, its location map value must be 0, otherwise the image has been tampered.

For a changeable difference number h, if its location map value is 0, then its original value will be differed from h by LSB. If $0 \leq h \leq 1$, the original value of h must be 1. The reason is that the original value could be only either 0 or 1, as it is differed from h by LSB. If the original value of h was 0, then it would be an expandable zero (as changeable zero is expandable), and its location map value would be 1, which contradicts the fact that the location map value is 0. Similarly if $-2 \leq h \leq -1$, the original value of h must be -2. For other changeable difference numbers, we restore their original LSB values from the embedded bit stream C.

The fifth and last step is content authentication and original content restoration. After all difference numbers have been restored to their original values, we apply the inverse integer transform (2) to reconstruct a restored image. To authenticate the content of the embedded image, we extract the embedded payload P from B (which will be the remaining after restoring difference numbers). We compare the authentication hash in P with the hash of the restored image. If they match exactly, then the image content is authentic, and the restored image will be exactly the same as the original image. (Most likely a tampered image will not go through to this step because some decoding error could happen in Step 4, as a non-changeable difference number might have a location map value 1 or a syntax error in JBIG2 bit stream.)

The decoding and authentication process for this embodiment operates as follows: It reconstructs a restored image I" from the embedded image I', then authenticates the content of I' by comparing the hash of the restored image I" and the decoded hash in P. If I' is authentic, then the restored image I" will be exactly the same as the original image I.

For multiple embedding, the first 16 bits in B is the pairing pattern H. After the first 16 bits are extracted, we decode the location map, reconstruct a restored image, and authenticate the content. If the content is authentic, we use H as the pairing pattern to decode the restored image again. The decoding process continues until H=0 or until tampering has been discovered (either a hash mismatch, JBIG2 decoding error, or wrong location map value). If H=0, and no tampering has been discovered during the whole decoding process, then the final restored image will be exactly the same as the original image, pixel by pixel, bit by bit.

Fourth Embodiment

This embodiment provides a reversible watermarking method of digital images. While the embodiment specifically applies the method to a digital image, the method can be applied to digital audio and video as well. This embodiment employs an integer wavelet transform to losslessly remove redundancy in a digital image to allocate space for watermark embedding. The embedding algorithm starts with a reversible color conversion transform. Then, it applies the integer wavelet transform to one (or more) de-correlated component(s). The purpose of both the reversible color conversion transform and the integer wavelet transform is to remove irregular redundancy in the digital image, such that we can embed regular redundancy into the digital image, for the purpose of content authentication and original content recovery. The regular redundancy could be a hash of the image, a compressed bit stream of the image, or some other image content dependent watermark. In the integer wavelet domain, we look into the binary representation of each wavelet coefficient and embed an extra bit into an "expandable" wavelet coefficient. Besides original content retrieval bit streams, an SHA-256 hash of the original image will also be embedded for authentication purposes. The method used in this embodiment is based on an integer wavelet transform, JBIG2 compression, and arithmetic coding.

The following is a simple example that illustrates the process. Assume that we have two grayscale values (x,y), where x,y∈Z, 0≦x,y≦255, and that we would like to embed one bit b with b∈{0, 1} into (x.y) in a reversible way. More specifically let us assume:

x=205, y=200, and b=0

First we compute the average l and difference h of and y:

$$l = \left\lfloor \frac{x+y}{2} \right\rfloor = \left\lfloor \frac{205+200}{2} \right\rfloor = 202, \quad h = x - y = 205 - 200 = 5$$

It is noted that the symbol ⌊ ⌋ demotes the integer part of a number. For Example:

⌊2.71⌋=2, ⌊−1.2⌋=−2

Next we expand the difference number h into its binary representation:

h=5=$101_2$

Then we add b into the binary representation of h at the location right after the most significant bit (MSB). It is noted that the MSB is always 1.

h'=1b$01_2$=$1001_2$=9

Finally we computer the new grayscale values, based on the new difference number h' and the original average value number l:

$$x' = l + \left\lfloor \frac{h'+1}{2} \right\rfloor = 202 + \left\lfloor \frac{9+1}{2} \right\rfloor = 207, \quad y' = x' - h' = 207 - 9 = 198$$

From the embedded pair (x',y'), the watermark detector can extract the embedded bit b and get back the original pair (x,y) by a process similar to the embedding process. Again, we compute the average and difference:

$$l' = \left\lfloor \frac{x'+y'}{2} \right\rfloor = 202, \quad h' = x' - y' = 207 - 198 = 9$$

The binary representation of h' is:

h'=9=$1001_2$

Extracting the second most significant bit, which is "0", as the embedded bit b which leaves: h"=$101_2$=5

Now with the average l' and difference h", we can retrieve exactly the original grayscale value pair (x,y).

In the above example, although the embedded pair (207, 198) is still 8 bpp, we have embedded an extra bit by increasing the bit length of the difference number h from 3 bits (which is the number 5) to 4 bits (which is the number 9). Such an embedding process is totally reversible.

Stated in a general manner: If we have a sequence of pairs of grayscale values $(x_1, y_1), (x_2, y_2) \ldots, (x_n, y_n)$ where $x_i, y_i \in Z$, $0 \leq x_i, y_i \leq 255$, $1 \leq i \leq n$ one can embed the payload: $b = \{b_1, b_2 \ldots b_n\}$ where $b_i \in \{0,1\}$, $1 \leq i \leq n$ by repeating the above process, $$l_i = \left\lfloor 2\frac{x_i+y_i}{2} \right\rfloor, h_i = x_i - y_i, \ 1 \leq i \leq n.$$

For each difference number $h_i$ expand it to a binary representation:

$$h_i = r_{i,0} r_{i,1} \ldots r_{i,j(i)}$$

where $r_{i,0}=1$ is the MSB, $r_{i,m} \in \{0,1\}$, for $1 \leq m \leq j(i)$. with j(i)+1 as the bit length of h, in its binary representation. Then we could embed $b_i$ into $h_i$ by $$h'_i = r_{i,0} b_i r_{i,1} \ldots r_{i,j(i)}.$$

Alternatively, we can combine all the bits $r_{i,m} \in \{0.1\}$, with $1 \leq m \leq j(i)$, $1 \leq I \leq n$ and $b = \{b_i.\}$ into a single bit stream. Note, that we do not select the MSBs.

$$B = r_{1,1} r_{1,2} \ldots r_{1,j(1)} r_{2,1} r_{2,2} \ldots r_{2,j(2)} \ldots r_{n,1} r_{n,2} \ldots r_{n,j(n)} b_1 b_2 \ldots b_n,$$

and use a reversible mapping $f$ which could be encryption, loss-less compression, or other invertible operations or a combination of such operations to form a new bit stream C:

$$C = f(B) = c_1 c_2 \ldots c_k$$

where $c_i \in \{0, 1\}$, for $1 \leq i \leq k$, with k as the bit length of C. Then we could embed C into the difference numbers $h_i$, $1 \leq i \leq n$ by $$h'_i = r_{i,0} c_{s(i-1)+1} c_{s(i-1)+2} \ldots c_{s(i)}$$

where:

$$c_{s(i-1)+1} c_{s(i-1)+2} \ldots c_{s(i)}$$

is a truncated subsequence of C with:

s(0)=0, and s(i)=s(i−1)+j(i)+1

The length of $h_i'$ is still one than that of $h_i$. For detection $f$ is reversible, we can get back B by $f^{-1}(C)$, and consequently, we can get back the original pairs $(x_1, y_1), (x_2, y_2) \ldots, (x_n, y_n)$ The reason we could increase the bit length of the difference number of an image is because of the high redundancy in pixels values of natural images. Thus, in most cases h will be very small and have a short bit length in its binary representation. In an edge area containing lots of activity, the difference number h from a pair of grayscale values could be large. For example if x=105, y=22, the h=x−y=83=1010011$_2$. If we embed a bit "0" into h, h'=10010011$_2$=147. with l=63 unchanged, the embedded pair will be x'=137, y'=−10. This will cause an underflow problem as grayscale values are restricted to the range [0,255]. Below we provide definition of "expandable pairs", which will prevent overflow and underflow problems.

Reversible color conversion: The reversible color conversion transform discussed below de-correlates the dependence among different color components to a large extent. It is a loss-less color transform and the transform output is still integer-valued. For a RGB color image, the reversible color conversion transform is:

$$Yr = \left\lfloor \frac{R + 2G + B}{4} \right\rfloor,$$
$$Ur = R - G,$$
$$Vr = B - G.$$

Its inverse transform will be:

$$G = Yr - \left\lfloor \frac{Ur + Vr}{4} \right\rfloor,$$
$$R = Ur + G,$$
$$B = Vr + G.$$

The reversible color conversion transform maps a grayscale valued triplet to an integer triplet. It can be thought of as an integer approximation of the CCIR 601 standard which provides a conversion to YcrCb space defined by the following matrix.

$$\begin{pmatrix} Y \\ Cr \\ Cb \end{pmatrix} = \begin{pmatrix} 0.299 & 0.587 & 0.114 \\ 0.500 & -0.419 & -0.081 \\ -0.169 & -0.331 & 0.500 \end{pmatrix} \begin{pmatrix} R \\ G \\ B \end{pmatrix}.$$

The RGB to YCrCb transform matrix is not integer-valued. It requires floating point computing. Such a transform will introduce small round off errors, and will not be a reversible transform. Since reversible watermarking requires original retrieval with 100% accuracy, we use the reversible color conversion transform instead of the RGB to YcrCb transform.

For a grayscale image there will be no reversible color conversion transform since we apply the integer wavelet transform directly.

Integer Wavelet Transform: The integer wavelet transform maps integers to integers and allows for perfect invertibility with finite precision arithmetic (i.e. reversible). The wavelet filters for integer wavelet transforms are dyadic rational, i.e., integers or rational numbers whose denominators are powers of 2, like 13/4, −837/32. Thus the integer wavelet transform can be implemented with only three operations, addition, subtraction, and shift, on a digital computer. The fast multiplication-free implementation is another advantage of the integer wavelet transform over standard discrete wavelet transform.

For example, for the Haar wavelet filter, the integer wavelet transform will be the average and difference calculation.

$$l_i = \left\lfloor \frac{x_{2i} + x_{2i+1}}{2} \right\rfloor, \quad h_i = x_{2i} - x_{2i+1}.$$

And for a biorthogonal filter pair with four vanishing moments for all four filters, the integer wavelet transform will be:

$$h_i = x_{2i+1} - \left\lfloor \frac{9}{16}(x_{2i} + x_{2i+2}) - \frac{1}{16}(x_{2i-2} + x_{2i+4}) + \frac{1}{2} \right\rfloor, \quad l_i = x_{2i} + \left\lfloor \frac{9}{32}(h_{i-1} + h_i) - \frac{1}{32}(h_{i-2} + h_{i+1}) + \frac{1}{2} \right\rfloor.$$

In this embodiment, we use will the Haar integer wavelet transform. The generalization to other integer wavelet transforms is understandable from this example.

After the reversible color conversion transform, we apply the integer wavelet transform to one (or more) de-correlated component. In this embodiment, we choose the Yr component, which is the luminance component. For a grayscale image, one can apply the integer wavelet transform directly to the whole image.

Expandable Wavelet Coefficient: For the grayscale-valued pair (105, 22) and a payload bit "0" (or "1"), a brute-force embedding will cause an underflow problem. Now we will show how to prevent the overflow and underflow problems.

For a grayscale-valued pair (x, y), where x, y∈Z, 0≦x, y≦255, define the average and difference as:

$$l := \left\lfloor \frac{x + y}{2} \right\rfloor, \quad h := x - y.$$

Then the inverse transform to get back (x, y) from the average number l and difference number h is:

$$x = l + \left\lfloor \frac{h + 1}{2} \right\rfloor, \quad y = l - \left\lfloor \frac{h}{2} \right\rfloor. \quad (41)$$

Thus to prevent the overflow and underflow problems, i.e., to restrict x, y in the range of [0, 255] is equivalent to have:

$$0 \le l + \left\lfloor \frac{h+1}{2} \right\rfloor \le 255, \quad 0 \le l - \left\lfloor \frac{h}{2} \right\rfloor \le 255.$$

Since both l and h are integers, one can derive that the above inequalities are equivalent to:

$$|h| \le 2(255 - l), \quad \text{and} \quad |h| \le 2l + 1. \quad (42)$$

Condition (42) above sets a limit on the absolute value of the difference number h. As long as h is in such range, it is guaranteed that (x, y) computed from Eqn. (41) will be grayscale values. Furthermore, Condition (42) is equivalent to $$\begin{cases} |h| \leq 2(255-l), & \text{if } 128 \leq l \leq 255 \\ |h| \leq 2l+1, & \text{if } 0 \leq l \leq 127 \end{cases}$$

With the above condition, we now define an expandable grayscale-valued pair.

Definition: For a grayscale-valued pair (x, y), where x, y∈Z, 0≤x, y≤255, define $$l = \left\lfloor \frac{x+y}{2} \right\rfloor, \quad h = x - y.$$

Then (x, y) is an expandable pair if and only if $$h \neq 0, \text{ and } 2^{\lfloor \log_2 |h| \rfloor + 2} - 1 \leq \min(2(255-l), 2l+1).$$

Note that if h≠0, the bit length of the binary representation of h is $\lfloor \log_2 |h| \rfloor + 1$ . . . Thus $$2^{\lfloor \log_2 |h| \rfloor + 2} - 1$$

is the largest number whose bit length is one more than that of |h|. Thus for an expandable pair (x, y), if we embed an extra bit ("0" or "1") into the binary representation of the difference number h at the location right after the MSB, the new difference number h' still satisfies Condition (42), that is, the new pair computed from Eqn. (41) is guaranteed to be grayscale values. For simplicity, we will also call h expandable if (x, y) is an expandable pair.

Thus from the average number l, one can tell whether or not a difference number h is expandable, i.e., whether or not the bit length of h could be increased by 1 without causing any overflow or underflow problem. Further we define the changeable bits of h as:

Definition: For a grayscale-valued pair (x, y), assume h≠0, and the binary representation of |h| is:

$$|h| = r_0 r_1 \ldots r_j,$$

where: $r_0 = 1$, $r_m \in \{0,1\}$, for $1 \leq m \leq j$, wih $j \geq 0$ and j+1 is the bit length. If g≤j is the largest number:

$$\left( \sum_{i=0}^{j-g} r_i 2^{j-i} \right) + 2^g - 1 \leq \min(2(255-l), 2l+1),$$

then we say (x.y), or equivalently h, has g changeable bits, and they are:

$$\tau_{j-g+1}, \tau_{j-g+2}, \ldots, \tau_j.$$

Since:

$$|h| = \tau_0 \tau_1 \ldots \tau_j = \sum_{i=0}^{j} \tau_i 2^{j-i},$$

by definition, h has g changeable bits if the last g bits in the binary representation are all changed to "1", it still satisfies Condition (42), or the new pair computed from Eqn. (41) is still grayscale values. Let's look at two extreme cases:

If g=0, then h has no changeable bits.
If g=j, then all bits (excluding the MSB) in its binary representation are changeable. It is clear that if h is expandable, then g=j. However the inverse is not true, i.e., g=j does not imply h is expandable.

The number "0" does not have a proper binary representation. We can increase it (along with all positive numbers) by 1 to fit it into the definition of expandable and changeable. With such preparation, we extract bits from wavelet coefficients as follows:

1. For the Yr component of a color image or a grayscale image, apply the integer wavelet transform.
2. If $h_i \geq 0$ and $l_i < 255$, we increase $h_i$ by 1, $h_i = h_i + 1$.
3. Construct a bit stream R, which consists of changeable bits from all $h_i$. The scanning order of $h_i$ is determined by a fixed pattern (for example, zigzag).

JBIG2 Compression: For a grayscale-valued pair (x, y), by the above definition we can tell whether or not it is expandable. When (x, y) has been modified by the embedder, it will not be clear to the watermark detector whether or not the original pair has been expanded, i.e., whether the bit length of the binary representation of the difference number has been increased by 1 (thus larger than the original one), or it is the same as the original one. In order to remove the watermark and retrieve the original, un-watermarked image, the detector needs to know the location of expanded difference numbers h in the original image.

We can define a location map of expanded difference numbers by setting its value to "1" at each location when it is expanded or "0" otherwise. The location map can be viewed as a bi-level image. To store the location map, we can losslessly compress the bi-level image and store the compressed bit stream instead. We will employ JBIG2, the new international standard for lossless compression of bi-level images, to compress the location map of expanded difference numbers h. For convenience, we will denote the JBIG2 compressed bit stream of the location map of expanded h as J. Alternatively, the location map could be compressed by run-length coding.

Arithmetic Coding: To make more room for embedding the payload, we can further losslessly compress the collected bit stream R, which are all the changeable bits from difference numbers h. Either arithmetic coding or Huffman coding could be used for this purpose. In this embodiment., we use arithmetic coding C=ArithmeticCoding(R)

where C is the compressed bit stream from the arithmetic coding.

SHA-256 Hash: To authenticate a watermarked image and detect tampering, we embed a hash of the image into itself. The new hash algorithm SHA-256 is a 256-bit hash function that is intended to provide 128 bits of security against collision attacks. SHA-256 is more consistent with the new encryption standard, the Advanced Encryption Standard (AES) algorithm, than SHA-1, which provides no more than 80 bits of security against collision attacks. We calculate the SHA-256 hash of the digital image (before the reversible color conversion transform) and denote the hash as H.

Embedding: With the compressed bit stream J of the location map, the compressed bit stream C of changeable bits, and the SHA-256 hash H (a 256 bit stream), we are ready to embed all three of sets into changeable bits of difference numbers h in the integer wavelet domain. First we combine the sets into one big bit stream:

$$S = J \bigcup C \bigcup H = s_1 s_2 \ldots s_k,$$

where $$s_i = \in \{0, 1\}, 1 \leq i \leq k$$

and k is the bit length of S.

As indicated above, we append C to the end of J, and append H to the end of C. The order of J, C, and H could be changed, as long as the embedder and the detector use the same order. Next we design a pseudo random scanning order for all the difference numbers h. This pseudo random order will be different from the scanning order used to construct the changeable bit stream R. With the pseudo random order of h, we embed the bit stream S into h by replacing (part of) changeable bits. For expandable h, we increase the bit length of h by 1, thus increase the number of changeable bits by 1. The following is a description of the embedding:

in S, a large portion of changeable bits will not be changed. We can select changeable bits based on how much difference it will introduce (how much it degrades the image quality) if it is changed during the embedding. We will discuss two difference cases here, non-expandable h and expandable h.

Modifying changeable bits in non-expandable h brings imperceptible changes to images. For example, in a sample image, if we restrict ourselves by not increasing the bit length of expandable h, and modify changeable bits only, then the worst possible distorted image is when we set changeable bits in h to be all equal to 1 or all equal to 0, depending on each h's value. In such a sample image, although the pixel value difference between the original and the distorted one is as large as 32, the visual difference between them is almost imperceptible.

For expandable h, if we increase its bit length by 1 and embed one more bit into it, the visual quality degradation could be very noticeable when |h| is large, like in an edge area or an area containing lots of activity. To achieve best image quality, the extra changeable bits which are not used for embedding should be allocated to those expandable h with large absolute values. If |h| is large, even if h is expandable, we can treat it as non-expandable by turning it off to "0" in the location map.

For security reasons, the compressed bit streams, T and C from JBIG2 and arithmetic coding can be encrypted by the AES algorithm, before they are embedded into changeable bits of difference numbers h.

Authentication: with respect to changeable bits, if we assume h has g changeable bits, and its binary representation is:

$$|h| = r_0 r_1 \ldots r_j.$$

1. Assume all difference numbers h are ordered by the pseudo random order as $h_1, h_2, \ldots, h_n$.
2. Set i = 1.
3. If $\leq$ n and k > 0,
   - If $h_i$ is expandable, $|h_i| = r_0 r_1 \ldots r_j$, and g = j,
   - Set $|h_i| = r_0 0 r_1 \ldots r_j$, now $|h_i|$ has j + 1 changeable bits.
   - Replace changeable bits in $h_i$ with $s_{k-g+1}, s_{k-g+2}, \ldots, s_k$.
   - For m = 1 : g
   - $r_{j-g+m} = s_{k-g+m}$.
   - If $h_i > 0$,
   - Set $h_i = h_i - 1$.
   - Set i = i + 1, k = k - g.
4. Go to Step 3.

We modify only the absolute value of h, and keep the sign (and its MSB) unchanged. If h is non-negative, since it has been increased by 1, after bit replacement, positive h will have its value decreased by 1.

The bit stream S is embedded by replacing changeable bits in difference numbers h. The capacity of all changeable bits will be much larger than the bit length of S. For example, the capacity of all changeable bits (including expanded bits) of a particular image could be 330,000 bits, while S is about 210,000 bits. In such a case there could be about a 120,000 bits surplus, which is 0.45 bpp for an image size 512×512. This is a huge extra space which could embed additional information (such as a compressed bit stream of the image for locating tampering and recovery). So after embedding all bits and if we arbitrarily change its changeable bits:

$$|h'| = r_0 r_1 \ldots r_{j-g} r'_{j-g+1} r'_{j-g+2} \ldots r'_g, \quad (45)$$

where $r'_{j-g+i} \in \{0, 1\}, 1 \leq i \leq g$ then the new pair defined by Eqn. (41) is still grayscale-valued, and the changeable bits of h' is exactly g.

Since the embedder does not change the average numbers l, the authenticator will derive exactly the same number of changeable bits in the difference number as the embedder. For expanded h whose bit length of its binary representation has been increased by 1 during the embedding, the authenticator will know such information from the location map. Thus, the authenticator knows exactly which bits have been replaced and which difference numbers are expanded (by one bit) during the embedding process. All these are crucial to retrieve back the original, un-watermarked image with 100% accuracy.

The authentication algorithm is similar to the embedding algorithm. The authentication algorithm goes through a reversible color conversion transform and the integer wavelet transform. From wavelet coefficients, it extracts all changeable bits, ordered by the same pseudo random order of the embedding. From the first segment of extracted bits, it decompress the location map of expanded difference numbers h. From the second segment, it decompresses the original changeable bits values. The third segment will give the embedded hash. From equation (45) above, one knows which bits are modified and which bits are extra expanded bits during the embedding. Thus one can reconstruct an image by replacing changeable bits with decompressed changeable bits. The extracted hash and the SHA-256 hash of the reconstructed image can be compared. If they match bit by bit, then the watermarked image is authentic, and the reconstructed image is exactly the original, un-watermarked image.

In summary, this fourth embodiment provides a reversible watermarking method based upon the integer wavelet transform. The location map of expanded wavelet coefficients, changeable bits of all coefficients, and an SHA-256 hash are embedded. An authenticator can remove the reversible watermark and retrieve an image, which is exactly the same as the original image, pixel by pixel.

While several specific embodiments have been described, those skilled in the art will realize that many alternative embodiments are possible using the principles described above. Furthermore the invention has a wide array of uses in additions to those discussed above.

For example, the present invention could be used to encode auxiliary data in software programs, manuals and other documentation. The technique could be used for the dual function of protecting the software (e.g., the software would not run until the embedded data was extracted with a secret key) and carrying auxiliary data related to the software, such as the manual or other program data. Alternatively, the software documentation may be embedded with executable software as the auxiliary data using the reversible embedding method.

A reversible watermarking scheme with two or more layers of embedded auxiliary data may be used to control the quality of distributed audio, video and still image content and control access to higher quality versions of that content. For example, a lower quality preview edition of the content can be embedded with one or more layers of reversible watermarks. As the user obtains rights to higher quality versions, the user can be provided with a key to reverse one or more layers of the reversible watermark, improving the quality of the content as each layer is removed. This approach has the advantage that the reversible watermark enables control of the quality, access to higher quality versions through reversal of the watermark, and additional metadata carrying capacity for information and executable instructions related to the content.

A reversible watermarking scheme can also be used to distribute a key inside of content. For example, a preview sample version of the content could include decryption keys to decrypt other related content.

The technique can be applied to encrypted content, where the reversible watermark carries decryption keys that are extracted and then used to decrypt content once the watermark has been reversed.

As explained above, one has freedom to pick pairs as one desires. One could choose a location map that provides the redundancy in the values of each pair that provides for better embedding capacity. This might make the location map more complex, but it would be possible.

It is noted that watermarking software with the present invention would in effect "introduce reversible errors" into the software. Thus, the watermark prevents execution of the software by anyone, except those who have the key to reverse the watermark. As such, the technique provides the benefit of encryption with the added benefit of being able to carry extra data in the watermark.

Encryption combined with compression might achieve some of the same effect as the use of the reversible watermark; however, reversible watermarking can provide security (you need the watermark key to reverse the watermark and run the software), extra data capacity (the watermark can carry program related data), and compressibility (the resulting file after watermarking is compressible). It is noted that a watermarked file may not be as compressible as prior to embedding.

There are a variety of ways to increase the size of the payload carried by a watermark applied in accordance with the present invention.

1. One can use a triplet of pixels to embed two bits instead of a pair of pixels to embed one bit. The following reversible transform can be used for this purpose:

$$\text{forward } V0 = \lfloor 1/3(I0+U1+U2) \rfloor$$
$$V1 = U2-U1$$
$$V2 = U0-U1$$
$$\text{reverse } U1 = V0 - \lfloor 1/3(V1+V2) \rfloor$$
$$U0 \text{ '2 } V2+U1$$
$$U2 = V1+U1$$

2. One can apply the technique to cross spectral components. If R, G and B are the three color component, the following reversible transform can be used.

$$\text{forward } Y \text{ '2 } \lfloor 1/4(R+2G+B) \rfloor$$
$$U = B-G$$
$$V \text{ '2 } R-G$$
$$\text{reverse } G = Y - \lfloor 1/4(U+V) \rfloor$$
$$R = V+G$$
$$B = U+G$$

3. One can combine (1) and (2) by applying (1) to each color component (row then column) then apply (2) to the result.
4. One can overlap pairs of pixels or triplets as discussed above to increase the payload.

The four specific embodiments of the invention described above use a 2×2 pixel region to maximize local other embodiments could use other size regions such as a 3×3 region etc.

While the invention has been explained with respect to various embodiments and alternatives, those skilled in the art will readily realized that a wide array of alternative embodiments are possible without departing from the spirit, scope and contribution of this invention. The scope of applicant's invention is limited only by the appended claims.

The following four technical papers were submitted with the application as originally filed, and are hereby incorporated herein in their entireties.

1) "Wavelet-based reversible watermarking for authentication" by Jun Tian SPIE ol 4675 January 2002 (this document has 12 pages).

2) "High Capacity Reversible Data Embedding and Content Authentication" by Jun Tian (this document has 4 pages).
3) "Reversible Watermarking by Difference Expansion" by Jun Tian, will be published in the Proceedings of Multimedia Security Workshop, Dec. 6, 2002.
4) "Reversible Data Embedding and Content Authentication Using Difference Expansion" by Jun Tian.

The invention claimed is:

1. A method of reversibly embedding auxiliary data in a data set comprising:
using a computer programmed to perform acts of:
transforming the data set from an original domain into transformed data values with an invertible transform;
expanding selected data values to embed auxiliary data;
inverting the transformed data values, including the data values selected for expansion, to return the transformed data values to the original domain, wherein the expanding comprises transforming the selected data values to new values that include one or more additional data states, the one or more additional data states carrying the auxiliary data and the new values including the selected data values such that the selected data values are maintained and perfectly restorable.

2. The method of claim 1 including:
identifying data values that can be expanded to embed auxiliary data values without causing an underflow or overflow.

3. A method of reversibly embedding auxiliary data in a data set comprising:
using a computer programmed to perform acts of:
transforming the data set from an original domain into transformed data values with an invertible transform;
expanding selected data values to embed auxiliary data;
inverting the transformed data values, including the data values selected for expansion, to return the transformed data values to the original domain;
wherein the transformation includes transforming the data set into fixed and variable values, the variable values forming a set from which certain transformed data values are selected for expansion.

4. The method of claim 3 wherein the fixed values remain unchanged during the auxiliary date embedding operation.

5. The method of claim 3 wherein the fixed values are averages of selected groups of elements in the data set, and the variable values are difference values of elements in the selected groups.

6. The method of claim 1 wherein the invertible transform comprises an integer to integer invertible transform.

7. A method of reversibly embedding auxiliary data in a data set comprising:
using a computer programmed to perform acts of:
transforming the data set from an original domain into transformed data values with an invertible transform;
expanding selected data values to embed auxiliary data;
inverting the transformed data values, including the data values selected for expansion, to return the transformed data values to the original domain;
wherein expanding comprises multiplying a first selected data value by a desired number of states and adding a number corresponding to a selected state of an auxiliary data value to be embedded in the first selected data value, and repeating the multiplying and adding for other data values selected for expansion to embed additional auxiliary data values.

8. The method of claim 7 including:
identifying data values that can be expanded to embed auxiliary data values without causing an underflow or overflow.

9. The method of claim 7 wherein the number of states is two, and the multiplying is performed by shifting bit positions in data values selected for expansion.

10. The method of claim 1 wherein data values selected for embedding expansion correspond to embedding locations that have a property that is invariant to changes due to embedding of the auxiliary data, and wherein the invariant property enables a decoder to identify embedding locations by analysis of the property at the embedding locations.

11. The method of claim 10 wherein the invariant property is identified based on whether a data value at an embedding location can be changed to embed data without causing an underflow or overflow condition.

12. A computer readable storage medium on which is stored instructions for performing the method of claim 1.

13. A method of reversibly embedding auxiliary data in a data set comprising:
using a computer programmed to perform acts of:
transforming the data set from an original domain into transformed data values with an invertible transform;
expanding selected data values to embed auxiliary data;
inverting the transformed data values, including the data values selected for expansion, to return the transformed data values to the original domain;
wherein the invertible transform comprises a transform to average and difference values, the difference values forming a set from which values are selected for auxiliary data embedding by expansion.

14. The method of claim 1 wherein the data set comprises an image signal.

15. The method of claim 1 wherein the transforming, expanding and inverting is performed repeatedly to data elements at embedding locations within the data set to embed two or more layers of auxiliary data.

16. The method of claim 15 wherein each layer has a different decoding key used to decode the layer.

17. A method of reversibly embedding auxiliary data in a data set comprising:
using a computer programmed to perform acts of:
transforming the data set from an original domain into transformed data values with an invertible transform;
expanding selected data values to embed auxiliary data;
inverting the transformed data values, including the data values selected for expansion, to return the transformed data values to the original domain;
wherein expanding includes inserting one or more extra bits into a selected data value to increase the number of bits after a most significant, non-zero bit, wherein the auxiliary data is carried in the one or more extra bits.

18. A method of reading auxiliary data reversibly embedded in a data set and restoring the data set to the same values as before the reversible embedding, the method comprising:
using a computer programmed to perform acts of:
transforming the data set from an original domain into transformed data values with an invertible transform;
extracting auxiliary data from data values previously selected for embedding of auxiliary data by expansion, including restoring the selected data values to the same values as before the embedding of the auxiliary data; and
inverting the transformed data values, including the data values selected for expansion, to return the transformed data values to the original domain.

19. A computer readable storage medium on which is stored instructions for performing the method of claim 18.

20. The method of claim 18 wherein one or more bits of the data values carry auxiliary data, and extracting includes reading the one or more bits of the data values.

21. The method of claim 18 including:
identifying data values that have an invariant property to embedding of auxiliary data to determine which data values are carrying auxiliary embedded data.

22. A method of reversibly embedding auxiliary data in a data set comprising:
using a computer programmed to perform acts of:
selecting embedding locations in the data set where data values have a property that is invariant to changes due to embedding of the auxiliary data, and wherein the invariant property enables a decoder to identify embedding locations by analysis of the property of the data values; and
reversibly embedding auxiliary data into data values at the embedding locations; including expanding selected data values to embed auxiliary data, wherein the expanding includes inserting one or more extra bits into a data value to increase the number of bits after a most significant, non-zero bit, wherein the auxiliary data is carried in the one or more extra bits.

23. A method of reversibly embedding auxiliary data in a data set comprising:
using a computer programmed to perform acts of:
selecting embedding locations in the data set where data values have a property that is invariant to changes due to embedding of the auxiliary data, and wherein the invariant property enables a decoder to identify embedding locations by analysis of the property of the data values; and
reversibly embedding auxiliary data into data values at the embedding locations; including expanding selected data values to embed auxiliary data, wherein expanding includes multiplying a data value by a number of states and adding a state corresponding to an auxiliary data value to be embedded.

24. The method of claim 22 wherein the invariant property is identified based on whether a data value at an embedding location can be changed without causing an underflow or overflow.

25. A computer readable storage medium on which is stored instructions for performing the method of claim 22.

26. A method of decoding reversibly embedded auxiliary data in a data set comprising:
using a computer programmed to perform acts of:
identifying a subset of locations in the data set where data values have a property that is invariant to changes due to embedding of the auxiliary data;
extracting auxiliary data from data values at the identified locations; and
restoring values of the data set to the same values as before the embedding of the auxiliary data into the data set; wherein the auxiliary data includes a location map indicating which of the subset of locations has been embedded with auxiliary data by expansion.

27. A computer readable storage medium on which is stored instructions for performing the method of claim 26.

28. The method of claim 26 wherein the auxiliary data is embedded by expansion of data values.

29. The method of claim 26 wherein the auxiliary data includes a location map indicating which of the subset of locations has been embedded with auxiliary data by expansion.

30. A method of embedding auxiliary data in a data set comprising:
using a computer programmed to perform acts of:
identifying values derived from the data set that are expandable; and
expanding the identified values by inserting an auxiliary data state corresponding to auxiliary data to be embedded in the identified values;
wherein the identified values are derived by exploiting correlation within the data set to compute values that are a function of the values in the original data set and that are more expandable than the values in the original data set.

* * * * *